United States Patent
Kim et al.

(10) Patent No.: US 12,499,282 B2
(45) Date of Patent: Dec. 16, 2025

(54) METHOD AND ELECTRONIC DEVICE TO PROVIDE PRIVATE INFORMATION IN RESPONSE TO SCREEN EXPANSION

(71) Applicant: SAMSUNG ELECTRONICS CO., LTD., Suwon-si (KR)

(72) Inventors: Jongtae Kim, Suwon-si (KR); Jongchae Moon, Suwon-si (KR); Hyungrae Cho, Suwon-si (KR); Joayoung Lee, Suwon-si (KR); Hoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 797 days.

(21) Appl. No.: 17/845,110

(22) Filed: Jun. 21, 2022

(65) Prior Publication Data
US 2023/0025142 A1    Jan. 26, 2023

Related U.S. Application Data

(63) Continuation of application No. PCT/KR2022/006649, filed on May 10, 2022.

(30) Foreign Application Priority Data

Jul. 16, 2021    (KR) .................. 10-2021-0093617

(51) Int. Cl.
*G06F 21/84*    (2013.01)
*G06F 21/31*    (2013.01)
(Continued)

(52) U.S. Cl.
CPC .............. *G06F 21/84* (2013.01); *G06F 21/31* (2013.01); *G06F 21/604* (2013.01); *G06F 21/6254* (2013.01)

(58) Field of Classification Search
CPC ........ G06F 21/84; G06F 21/31; G06F 21/604; G06F 21/6254; G06F 21/606;
(Continued)

(56) References Cited

U.S. PATENT DOCUMENTS

2016/0378270 A1* 12/2016 Lee ...................... G06F 1/1647
                                                              715/788
2017/0228549 A1    8/2017 Xuan et al.
(Continued)

FOREIGN PATENT DOCUMENTS

CN    107643912    1/2018
CN    112905098    6/2021
(Continued)

OTHER PUBLICATIONS

Extended European Search Report dated Jan. 8, 2024 issued in European Patent Application No. 22842255.6.
(Continued)

*Primary Examiner* — Trong H Nguyen
(74) *Attorney, Agent, or Firm* — NIXON & VANDERHYE P.C.

(57) ABSTRACT

According to an example embodiment, an electronic device monitors an occurrence of private information from a connected external device and provides, in an expanded screen region, the private information of the external device from which the private information occurs in response to screen expansion.

18 Claims, 29 Drawing Sheets

(51) Int. Cl.
  *G06F 21/60* (2013.01)
  *G06F 21/62* (2013.01)
(58) Field of Classification Search
  CPC .... G06F 21/6245; G06F 3/016; G06F 3/0481; G06F 3/14; H04W 12/02
  See application file for complete search history.

(56) References Cited

U.S. PATENT DOCUMENTS

| | | | |
|---|---|---|---|
| 2023/0081152 A1* | 3/2023 | Blazevige | G06Q 20/20 705/42 |
| 2024/0086580 A1* | 3/2024 | Hao | G06F 21/32 |
| 2024/0320377 A1* | 9/2024 | Liu | G06F 21/6245 |

FOREIGN PATENT DOCUMENTS

| | | | |
|---|---|---|---|
| EP | 3373184 | 9/2018 | |
| KR | 10-2012-0020402 | 3/2012 | |
| KR | 10-2015-0048575 | 5/2015 | |
| KR | 10-2016-0001628 | 1/2016 | |
| KR | 10-2016-0029551 | 3/2016 | |
| KR | 10-2017-0000553 | 1/2017 | |
| KR | 10-2017-0060480 | 6/2017 | |
| KR | 10-1770156 | 8/2017 | |
| KR | 10-2018-0089229 | 8/2018 | |
| KR | 10-2020-0101306 | 8/2020 | |
| KR | 10-2021-0033784 | 3/2021 | |
| WO | WO-2021031849 A1 * | 2/2021 | ........... G06F 1/1618 |

OTHER PUBLICATIONS

Search Report dated Aug. 9, 2022 issued in International Patent Application No. PCT/KR2022/006649.

* cited by examiner

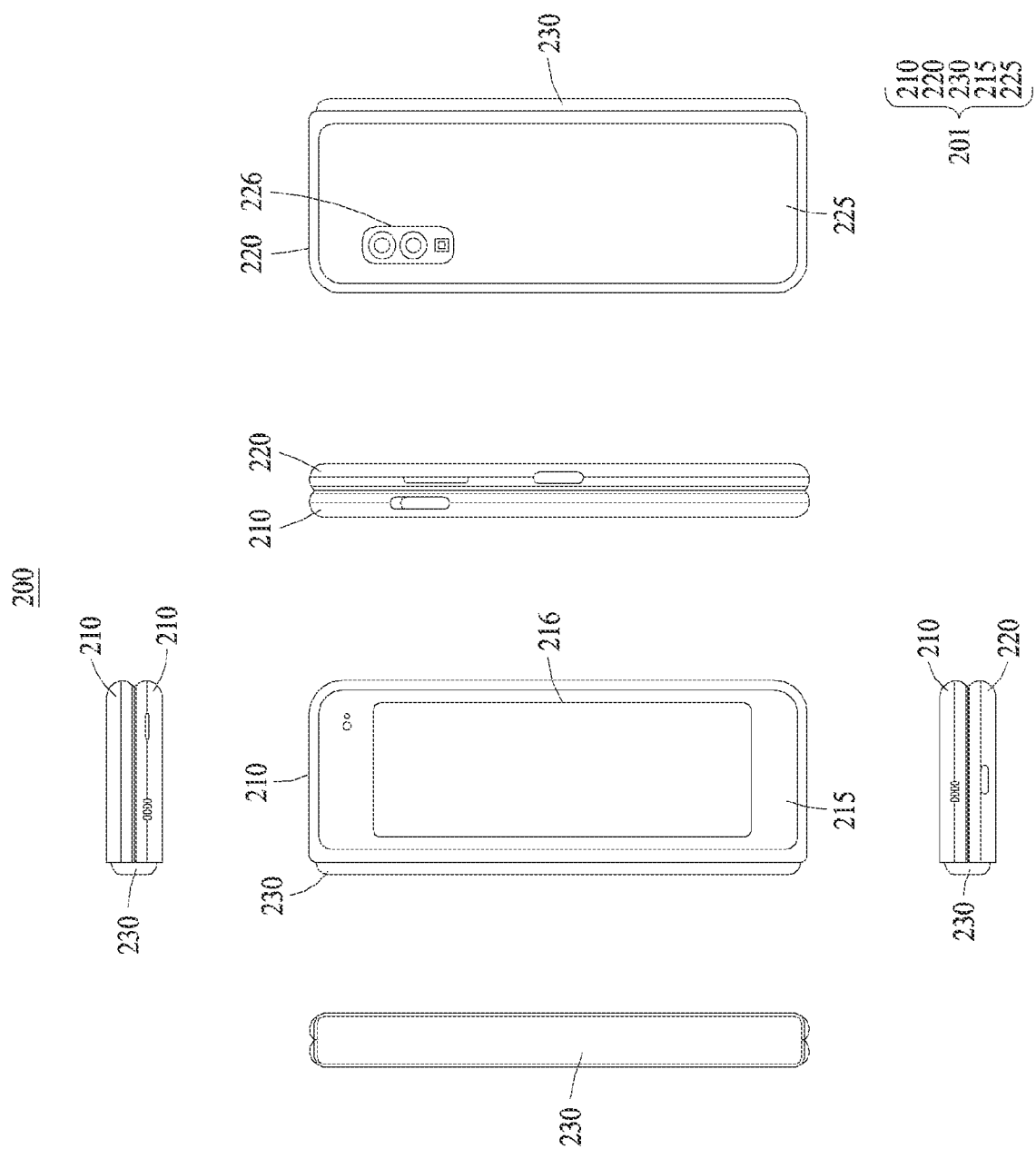

METHOD AND ELECTRONIC DEVICE TO PROVIDE PRIVATE INFORMATION IN RESPONSE TO SCREEN EXPANSION

CROSS-REFERENCE TO RELATED APPLICATIONS

This application is a continuation of International Application No. PCT/KR2022/006649 designating the United States, filed on May 10, 2022, in the Korean Intellectual Property Receiving Office and claiming priority to Korean Patent Application No. 10-2021-0093617 filed on Jul. 16, 2021, in the Korean Intellectual Property Office, the disclosures of which are incorporated by reference herein in their entireties.

BACKGROUND

1. Field

The disclosure relates to a technology for providing private information in response to screen expansion.

2. Description of Related Art

An Internet of things (IoT) application may rapidly provide various information about IoT devices that changes in real time. The IoT application may generally display default device state information (e.g., power off/on) which is changed by an operation performed by a user. However, sensitive information about an individual, such as information generated from devices closely related to a residential environment or personal life of the individual, may be collected from the IoT devices.

The IoT application may expose the sensitive information and the state information on one screen at once, or may provide a screen that may be shown only after an entry into a detailed device page and a screen shift.

SUMMARY

According to an example embodiment, an electronic device includes: a display module including an expandable screen; a communication module comprising communication circuitry configured to establish communication with one or more external devices; and a processor electrically connected to the display module and the communication module. The processor may be configured to: monitor an occurrence of private information from the external devices; and based on screen expansion of the display module being detected, display, in an expanded screen region of the electronic device through the display module, private information of an external device from which the private information occurs among the external devices.

According to an example embodiment, a method of providing private information performed by an electronic device includes: monitoring an occurrence of private information from one or more external devices with which the electronic device establishes communication; and based on a screen expansion of an expandable display module being detected, displaying private information of an external device from which the private information occurs among the external devices in an expanded screen region of the electronic device through the display module.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3 is a diagram illustrating a foldable electronic device in a folded state according to various embodiments;

DETAILED DESCRIPTION

Figure 1:
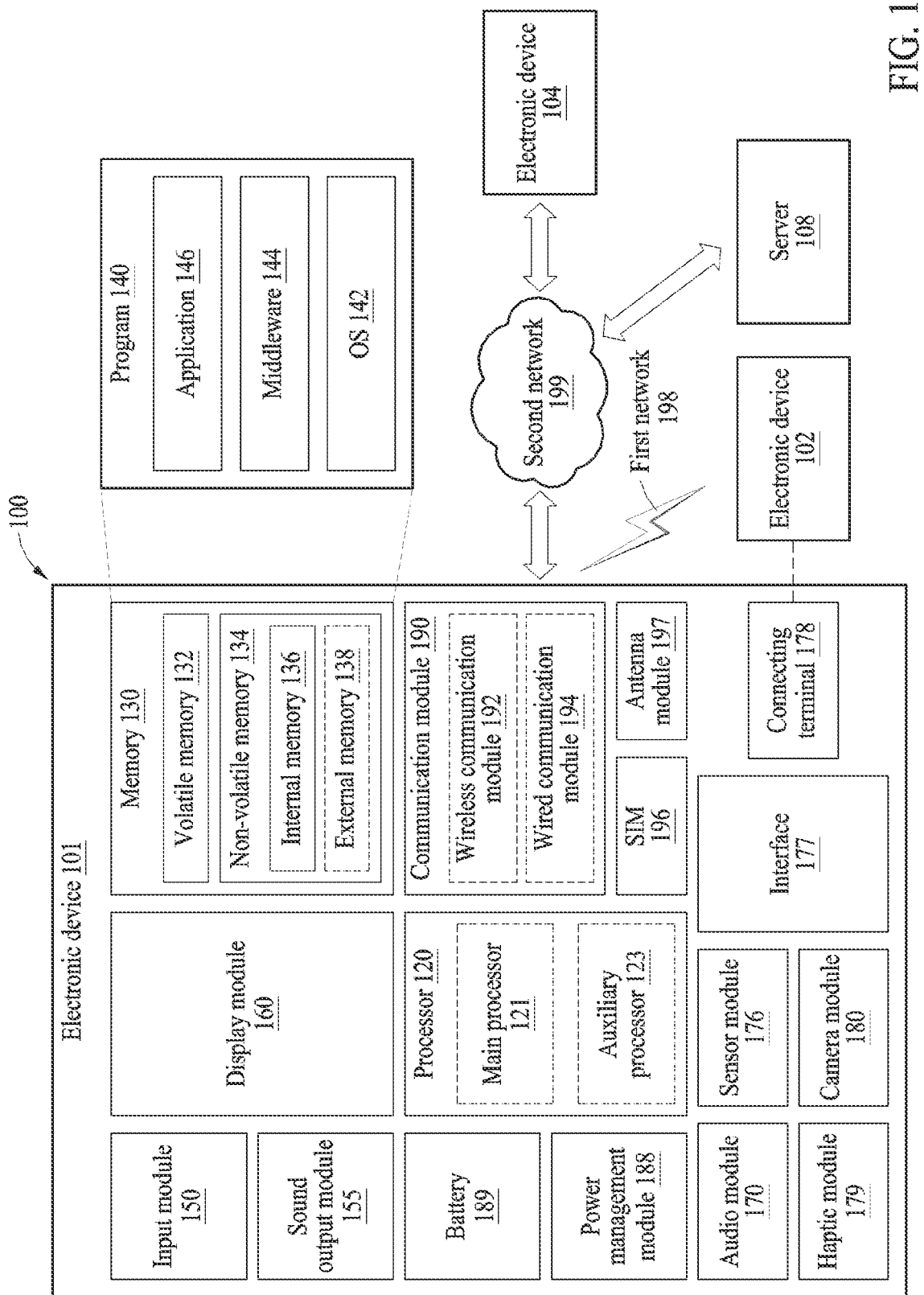
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereof may be omitted.

FIG. 1 is a block diagram illustrating an example electronic device in a network environment according to various example embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The display module 160 may have an expandable screen. The display module 160, which is a flexible display, may have a display screen of a varying size viewed by a user of the electronic device 101. For example, in an electronic device having an in-folding type foldable display to be described later with reference to FIGS. 2, 3, 4A, and 4B, a display screen to be viewed by a user may be provided on a sub-display, and be provided on the foldable display through unfolding and/or unbending. For example, the size of a region of the display screen viewed by the user may be expanded through unfolding and/or unbending. For another example, in an electronic device having an out-folding type foldable display, a display screen to be viewed by a user may be provided in a partial region of the foldable display, and be provided in an entire region of the foldable display through unfolding and/or unbending. For still another example, in a rollable type electronic device to be described later with reference to FIGS. 5A and 5B, and 6A and 6B, a display screen of a flexible display may be expanded by an opening operation performed by a movement of a housing. However, the display module 160 is not limited to the foldable type or the rollable type, but may be a display having a display screen viewed by a user of which size is changeable (e.g., a size changeable from a first screen size to a second screen size greater than the first screen size).

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology. The external electronic device 104 will be referred to hereinafter as an "external device" and an IoT device will be mainly described as an example of the external device.

Figure 2:
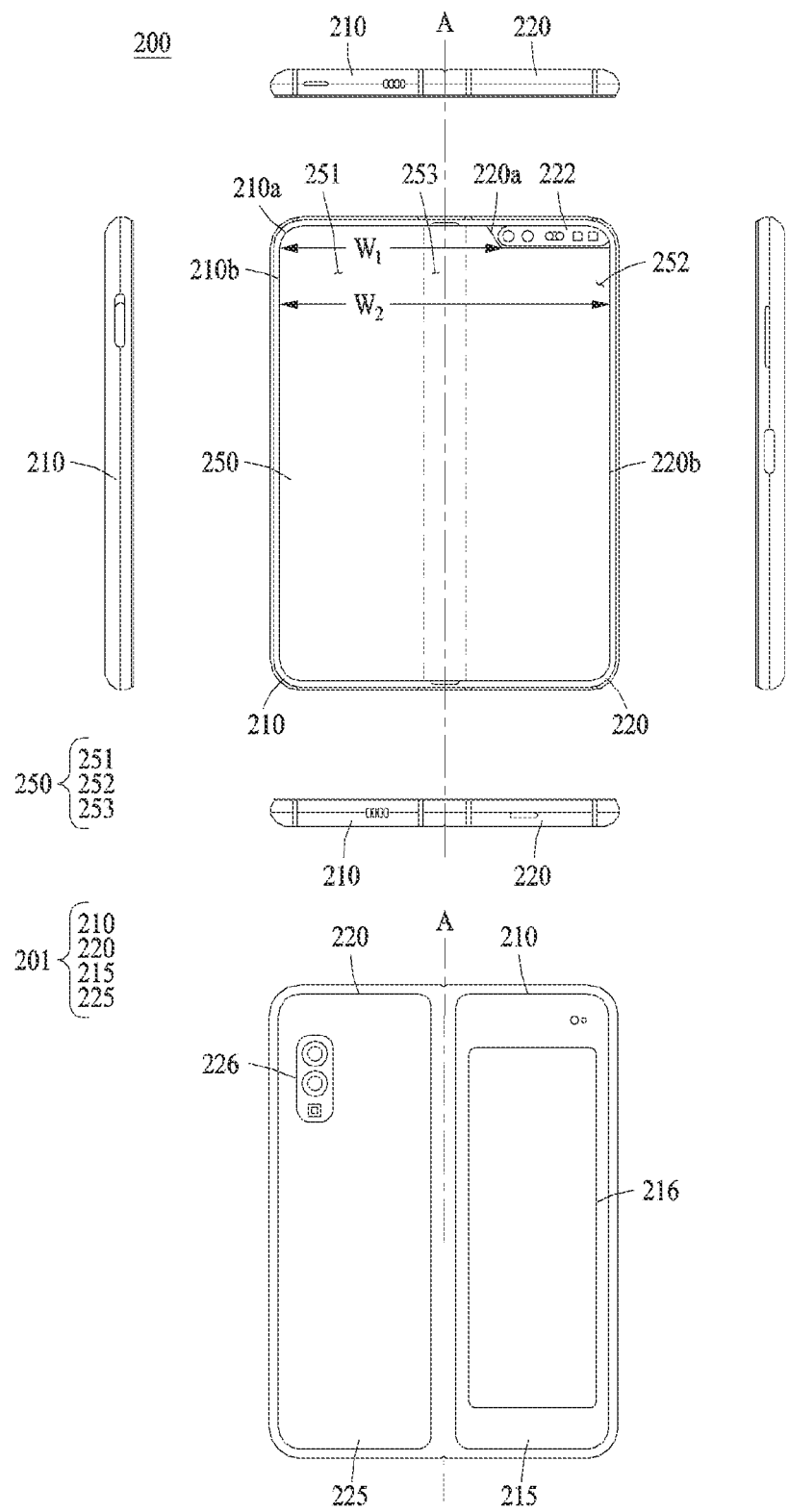
FIG. 2 is a diagram illustrating a foldable electronic device in an unfolded state according to various embodiments.
Figure 4A:
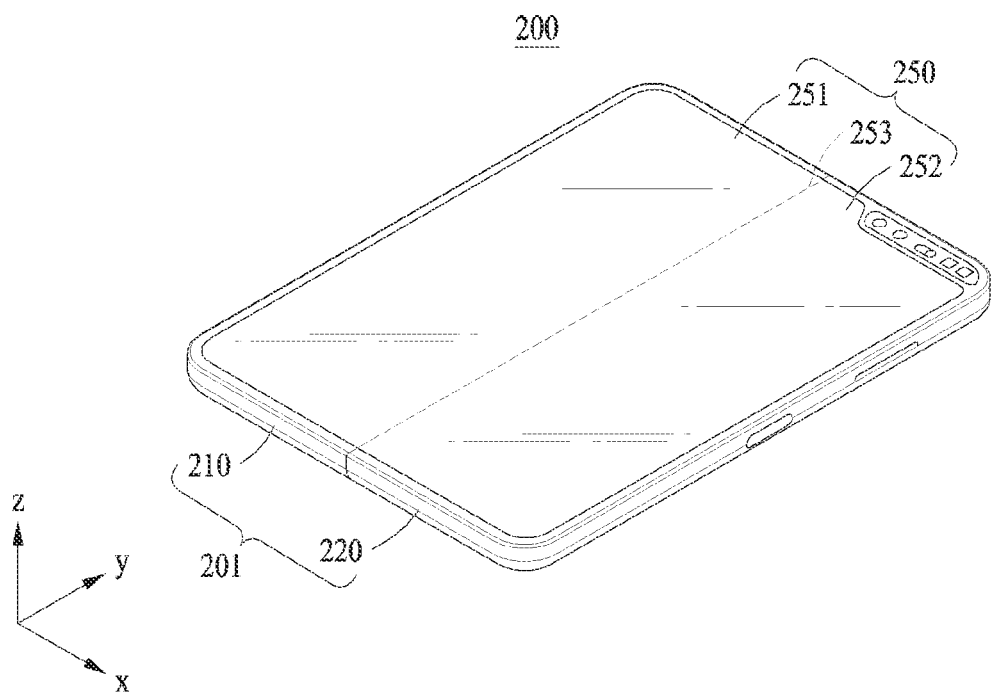
FIGS. 4A and 4B are perspective views of an electronic device in a fully unfolded state and a partially unfolded state (or an intermediate state) according to various embodiments.
Figure 4B:
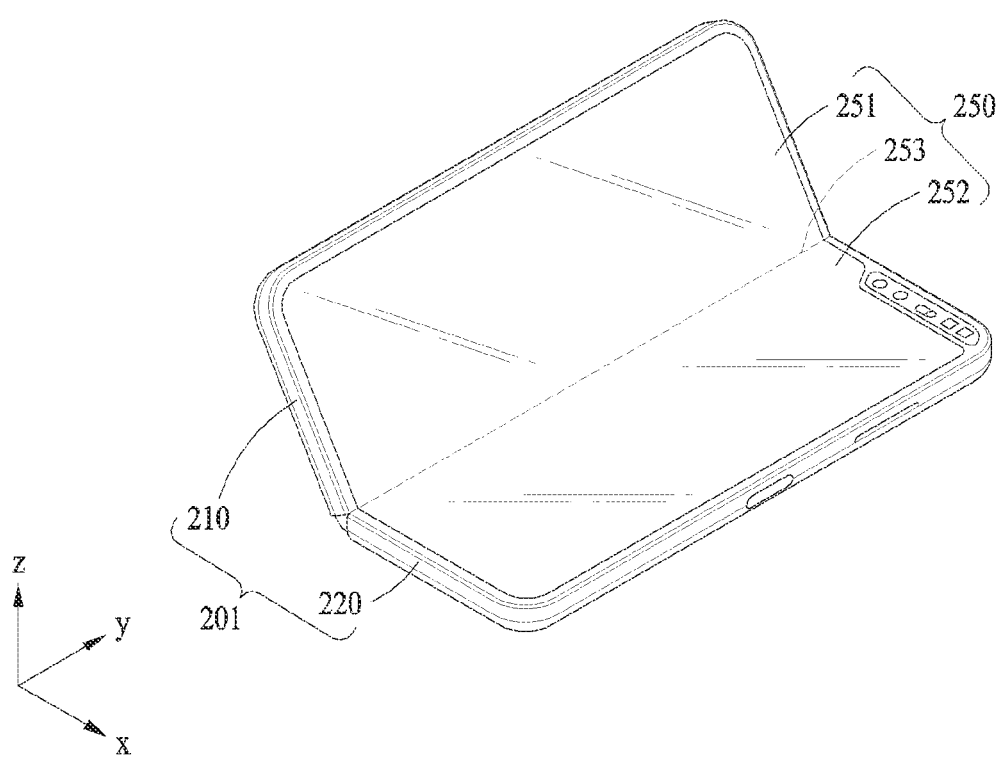

FIG. 2 is a diagram illustrating a foldable electronic device in an unfolded state according to various embodiments. FIG. 3 is a diagram illustrating a foldable electronic device in a folded state according to various embodiments. FIGS. 4A and 4B are perspective views of a foldable electronic device in a fully unfolded state and a partially unfolded state (or an intermediate state) according to various embodiments.

Referring to FIGS. 2, 3, and 4A and 4B, an electronic device 200, which is provided as an example of the electronic device 101 of FIG. 1, may be a foldable or bendable electronic device.

In FIGS. 4A and 4B, and other following drawings, illustrated is a spatial coordinate system defined by an X axis, a Y axis, and a Z axis that are orthogonal to each other. The X axis indicates a width direction of an electronic device, the Y axis indicates a longitudinal direction of the electronic device, and the Z axis indicates a height (or thickness) direction of the electronic device. In the following description, a first direction may indicate a direction parallel to the Z axis.

Referring to FIGS. 2 and 3, according to an example embodiment, the electronic device 200 may include a foldable housing 201, and a flexible or foldable display 250 (hereinafter simply referred to as the "display" 250) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. In addition, a surface surrounding a space between the front surface and the rear surface may be defined as a side surface of the electronic device 200.

The foldable housing 201 may include a first housing structure 210, a second housing structure 220 including a sensor area 222, a first rear surface cover 215, a second rear surface cover 225, and a hinge structure 230. The hinge structure 230 may include a hinge cover that covers a foldable portion of the foldable housing 201. However, the foldable housing 201 of the electronic device 200 is not limited to the shape and connection illustrated in FIGS. 2 and 3, but may be implemented to have another shape or through a combination and/or connection of components or parts. For example, the first housing structure 210 and the first rear surface cover 215 may be integrated, and the second housing structure 220 and the second rear surface cover 225 may be integrated.

The first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

The first surface and the third surface may meet when the electronic device 200 is in a fully folded state (e.g., a state in which the electronic device 200 is fully folded), and the third direction and the first direction are the same when the electronic device 200 is in a fully unfolded state (e.g., a state in which the electronic device 200 is fully unfolded).

The first housing structure 210 and the second housing structure 220 may be disposed on both sides with respect to a folding axis A, and may be overall symmetrical with respect to the folding axis A. As to be described later, an angle or distance between the first housing structure 210 and the second housing structure 220 may vary according to whether the state of the electronic device 200 is the unfolded state, the folded state, or a partially unfolded or folded state (or an intermediate state). Unlike the first housing structure 210, the second housing structure 220 may additionally include the sensor area 222 in which various sensors are disposed. However, apart from such an area, the first housing structure 210 and the second housing structure 220 may be symmetrical in other areas.

As illustrated in FIG. 2, the first housing structure 210 and the second housing structure 220 may together form a recess that accommodates therein the display 250. Due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 that is not the sensor area 222 and is parallel to the folding axis A. In this example, the second width w2 may be greater than the first width w1. The first portion 220a and the second portion 220b of the second housing structure 220 may be at different distances from the folding axis A. However, the width of the recess is not limited to the example widths. For example, the recess may have a plurality of widths according to the shape of the sensor area 222 or an asymmetrical portion of the first housing structure 210 and the second housing structure 220. The sensor area 222 may be formed to have a predetermined area adjacent to one corner of the second housing structure 220. However, the arrangement, shape, and size of the sensor area 222 are not limited to the illustrated example. For another example, the sensor area 222 may be provided at another corner of the second housing structure 220 or in an area between an upper corner and a lower corner. Components embedded in the electronic device 200 to perform various functions may be exposed to the front surface of the electronic device 200 through the sensor area 222 or through one or more openings provided in the sensor area 222. The components may include various types of sensors. The sensors may include, for example, at least one of a front camera, a receiver, or a proximity sensor. According to other example embodiments, the sensor area 222 may not be included in the second housing structure 220 or may be formed at a position different from the illustrated position.

At least a portion of the first housing structure 210 and the second housing structure 220 may be formed of a metal material or non-metal material having rigidity of a selected magnitude to support the display 250. The portion formed of the metal material may provide a ground plane for the electronic device 200, and may be electrically connected to a ground line formed on a printed circuit board (PCB) disposed inside the foldable housing 201.

The first rear surface cover 215 may be disposed on one side of the folding axis A on the rear surface of the electronic device 200, and may have, for example, a substantially rectangular periphery that is surrounded by the first housing structure 210. Similarly, the second rear surface cover 225 may be disposed on the other side of the folding axis A on the rear surface of the electronic device 200, and may have a periphery that is surrounded by the second housing structure 220.

The first rear surface cover 215 and the second rear surface cover 225 may be substantially symmetrical with respect to the folding axis A. However, the first rear surface cover 215 and the second rear surface cover 225 are not necessarily symmetrical, but the electronic device 200 may include a first rear surface cover and a second rear surface cover of various shapes. According to another example embodiment, the first rear surface cover 215 may be integrated with the first housing structure 210, and the second rear surface cover 225 may be integrated with the second housing structure 220.

The first rear surface cover 215, the second rear surface cover 225, the first housing structure 210, and the second housing structure 220 may form a space in which various components (e.g., a PCB or a battery) of the electronic device 200 are disposed. According to an example embodiment, one or more components may be disposed or visually exposed on the rear surface of the electronic device 200. For example, at least a portion of a sub-display may be visually exposed through a first rear area 216 of the first rear surface cover 215. According to another example embodiment, one or more components or sensors may be visually exposed through a second rear area 226 of the second rear surface cover 225. The sensors may include a proximity sensor and/or a rear camera.

A front camera exposed to the front surface of the electronic device 200 through one or more openings provided in the sensor area 222 or a rear camera exposed through the second rear area 226 of the second rear surface cover 225 may include one or more lenses, an image sensor, and/or an image signal processor (ISP). A flash may include, for example, a light-emitting diode (LED) or a xenon lamp. According to some example embodiments, two or more lenses (infrared (IR) camera, and wide-angle and telephoto lenses) and image sensors may be disposed on one surface of the electronic device 100.

Referring to FIG. 3, the hinge cover may be disposed between the first housing structure 210 and the second housing structure 220 to cover internal components (e.g., the hinge structure 230). The hinge structure 230 may be covered by a portion of the first housing structure 210 and the second housing structure 220, or may be exposed to the outside, according to the state of the electronic device 200 (e.g., the unfolded state, the intermediate state, or the folded state).

For example, when the electronic device 200 is in the unfolded state (e.g., the fully unfolded state) as illustrated in FIG. 2, the hinge structure 230 may be covered by the first housing structure 210 and the second housing structure 220 not to be exposed. For another example, when the electronic device 200 is in the folded state (e.g., the fully folded state) as illustrated in FIG. 3, the hinge structure 230 may be exposed to the outside, being between the first housing structure 210 and the second housing structure 220. For still another example, when the electronic device 200 is in the intermediate state with a certain angle formed between the first housing structure 210 and the second housing structure 220, the hinge structure 230 may be partially exposed to the outside, being between the first housing structure 210 and the second housing structure 220. In this example, an exposed area may be smaller than an area exposed in the fully folded state. The hinge structure 230 may include a curved surface.

The display 250 may be disposed in a space formed by the foldable housing 201. For example, the display 250 may be seated on the recess formed by the foldable housing 201 and be viewed from the outside through the front surface of the electronic device 200. For example, the display 250 may form a most portion of the front surface of the electronic device 200. Accordingly, the front surface of the electronic device 200 may include the display 250, and a partial area of the first housing structure 210 and a partial area of the second housing structure 220 that are adjacent to the display 250. In addition, the rear surface of the electronic device 200 may include the first rear surface cover 215, a partial area of the first housing structure 210 adjacent to the first rear surface cover 215, the second rear surface cover 225, and a partial area of the second housing structure 220 adjacent to the second rear surface cover 225.

The display 250 may be a display of which at least one area is deformable into a planar surface or a curved surface. The display 250 may include a folding area 253, a first area 251 disposed on one side of the folding area 253 (e.g., on the left side of the folding area 253 in FIG. 2), and a second area 252 disposed on the other side of the folding area 253 (e.g., on the right side of the folding area 253 in FIG. 2).

However, such an area division of the display 250 as illustrated in FIG. 2 is provided merely as an example, and the display 250 may be divided into a plurality of areas (e.g., two areas or four or more areas) according to a structure or functions thereof. For example, as illustrated in FIG. 2, the display 250 may be divided into areas based on the folding area 203 extending in parallel to the folding axis A. For another example, the display 250 may be divided into areas based on another folding axis (e.g., a folding axis parallel to the width direction of the electronic device 200).

The display 250 may be combined with or disposed adjacent to a touch panel including a touch sensing circuit and a pressure sensor configured to measure the intensity (or pressure) of a touch. For example, for the touch panel, the display 250 may be coupled to or disposed adjacent to the touch panel for detecting a stylus pen of an electromagnetic resonance (EMR) type.

The first area 251 and the second area 252 may be overall symmetrical with respect to the folding area 253. Unlike the first area 251, the second area 252 may include a notch cut according to the presence of the sensor area 222, but may be symmetrical to the first area 251 in the other areas except for such an area. For example, the first area 251 and the second area 252 may include mutually symmetrical portions and mutually asymmetrical portions.

The first area 251 and the second area 252 may each have an edge thickness different from an edge thickness of the folding area 253. The edge thickness of the folding area 253 may be less than the edge thickness of the first area 251 and the second area 252. For example, when cross-sectionally viewed, the first area 251 and the second area 252 may be asymmetrical in terms of thickness. For example, an edge of the first area 251 may be formed to have a first radius of curvature, and an edge of the second area 252 may be formed to have a second radius of curvature different from the first radius of curvature. For another example, when cross-sectionally viewed, the first area 251 and the second area 252 may be symmetrical in terms of thickness. The foregoing examples will be described in greater detail below with reference to the accompanying drawings after FIG. 10A.

Hereinafter, each area of the display 250 and operations of the first housing structure 210 and the second housing structure 220 will be described in relation to the state of the electronic device 200, for example, the folded state, the unfolded state, or the intermediate state. When the electronic device 200 is in the unfolded state as illustrated in FIG. 2, the first housing structure 210 and the second housing structure 220 may be disposed to face the same direction with an angle of 180° formed therebetween. The surfaces of the first area 251 and the second area 252 of the display 250 may form the angle of 180° and face the same direction (e.g., a direction of the front surface of the electronic device 200). The folding area 253 may form the same plane along with the first area 251 and the second area 252.

When the electronic device 200 is in the folded state as illustrated in FIG. 3, the first housing structure 210 and the second housing structure 220 may be disposed to face each other. The surfaces of the first area 251 and the second area 252 of the display 250 may face each other with a narrow angle (e.g., an angle between 0° and 10° formed therebetween. In this case, the folding area 253 may be formed to have a curved surface having a predetermined curvature, in at least a portion thereof.

When the electronic device 200 is in the intermediate state, the first housing structure 210 and the second housing structure 220 may be disposed with a certain angle therebetween. The surfaces of the first area 251 and the second area 252 of the display 250 may form an angle that is greater than an angle formed therebetween in the folded state and less than an angle formed therebetween in the unfolded state. In this case, the folding area 253 may be formed to have a curved surface having a predetermined curvature, in at least a portion thereof. The curvature may be less than that formed in the folded state.

FIGS. 4A and 4B are perspective views of an electronic device in a fully unfolded state and a partially unfolded state (or an intermediate state) according to various example embodiments. As described above, a state of the electronic device 200 may be changed to a folded state or an unfolded state, for example. When viewed in a direction of a folding axis (e.g., an A axis in FIG. 2), the electronic device 200 may be folded in two manners—in-folding allowing the front surface of the electronic device 200 to form an acute angle and out-folding allowing the front surface of the electronic device 200 to form an obtuse angle. For example, the electronic device 200 of a foldable type may be classified into an in-folding type device that is folded through the in-folding and an out-folding type device that is folded through the out-folding. For example, when the electronic device 200 is in a state in which the electronic device 200 is folded through the in-folding, the first surface of the first housing structure 210 and the third surface of the second housing structure 220 may meet (or face) each other. When the electronic device 200 is a fully unfolded state, the first surface of the first housing structure 210 and the third surface of the second housing structure 220 may face the same direction (e.g., a direction parallel to a Z axis).

For example, when the electronic device 200 is in a state in which the electronic device 200 is folded through the out-folding, the second surface of the first housing structure 210 and the fourth surface of the second housing structure 220 may meet (or face) each other.

In addition, although not illustrated, the electronic device 200 may include a plurality of hinge axes (e.g., two parallel hinge axes including the A axis in FIG. 2 and another axis parallel to the A axis). In this case, the electronic device 200 may be folded through multi-folding which is a combination of the in-folding and the out-folding.

An in-folding type described herein may indicate a state in which the display 250 is not exposed to the outside in a fully folded state, and an out-folding type described herein may indicate a state in which the display 250 is exposed to the outside in the fully folded state. FIG. 4B illustrates the electronic device 200 that is partially unfolded in the process of the in-folding, for example, in an intermediate state.

Although the state in which the electronic device 200 is folded through the in-folding will be mainly described as an example hereinafter, the following description may also be applicable to the state in which the electronic device 200 is folded through the out-folding.

Figure 5A:
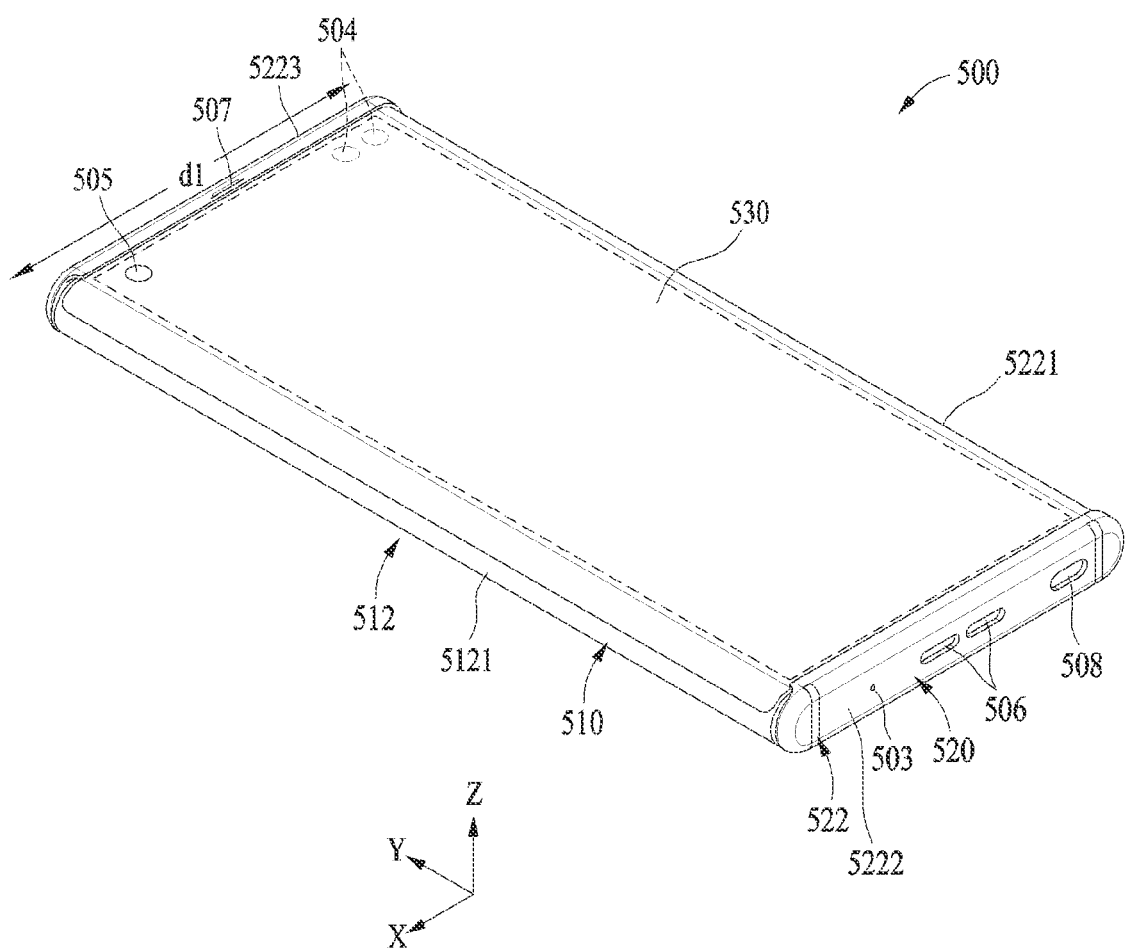
FIGS. 5A and 5B are front perspective views of an expandable electronic device in a closed state and an open state according to various embodiments.
Figure 5B:
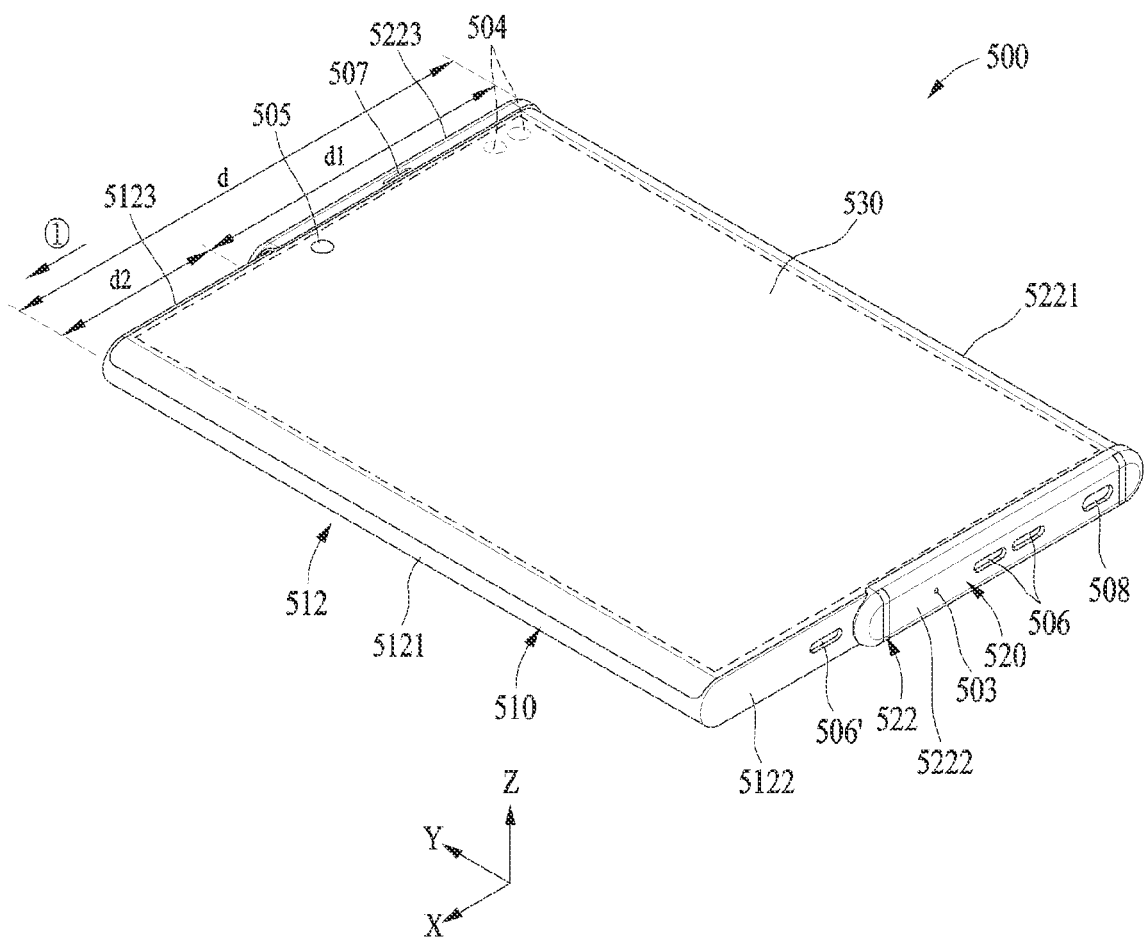
Figure 6A:
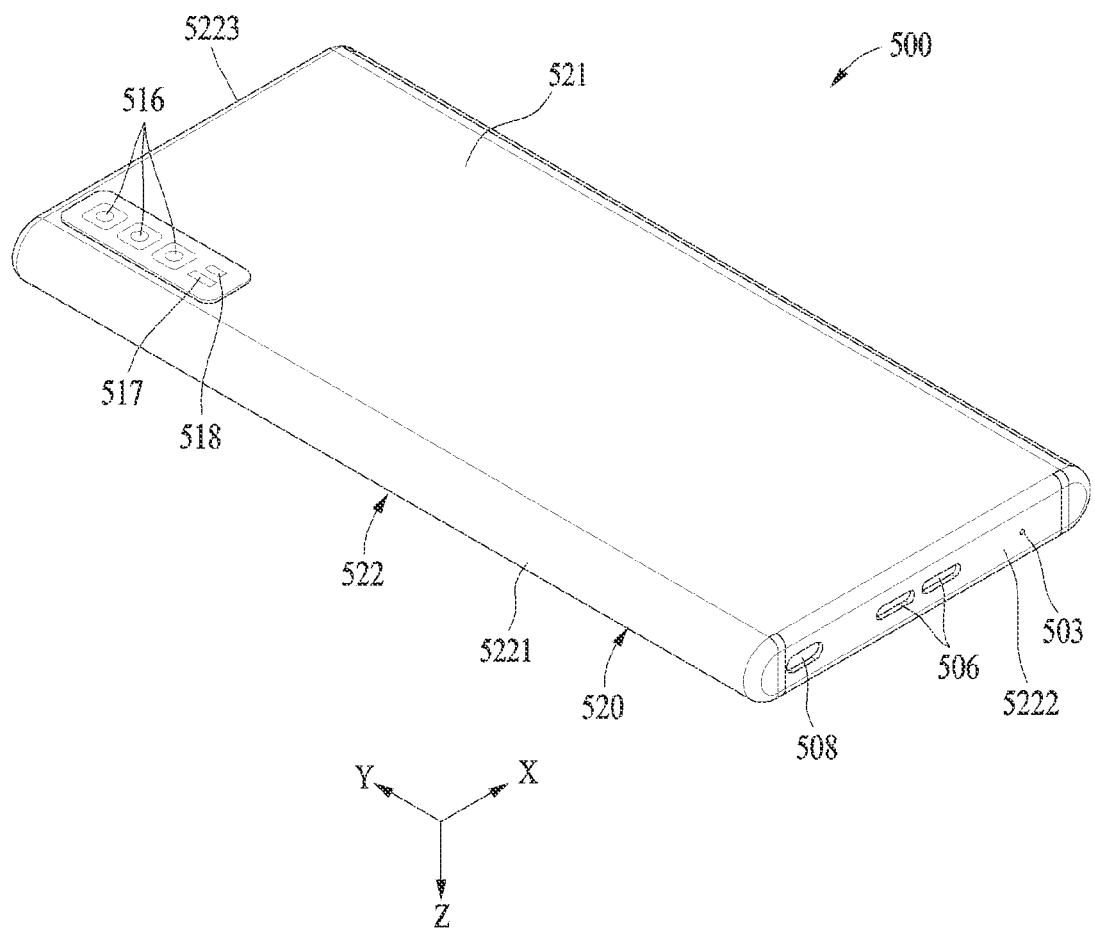
FIGS. 6A and 6B are rear perspective views of an expandable electronic device in a closed state and an open state according to various embodiments.
Figure 6B:
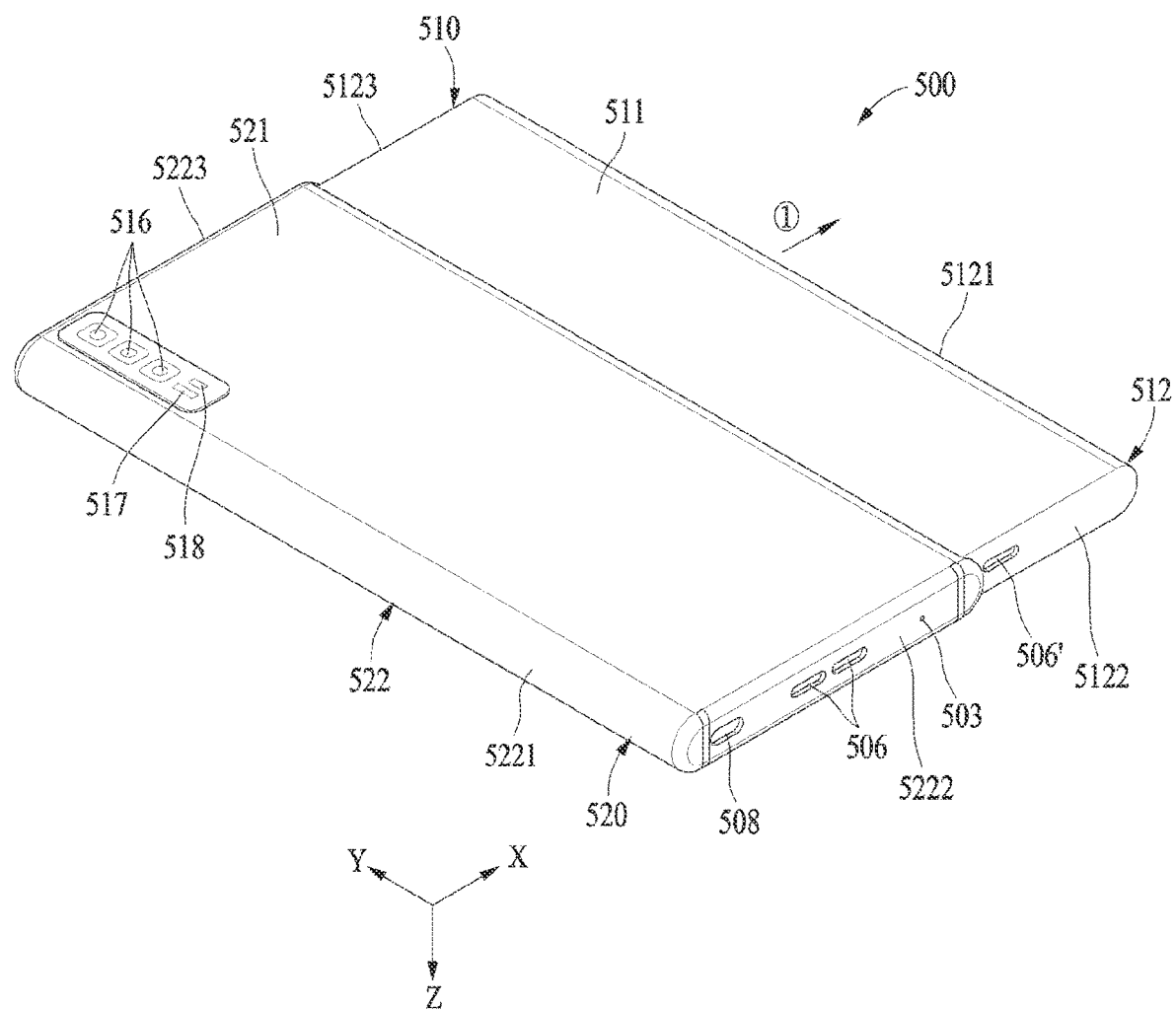
Figure 7A:
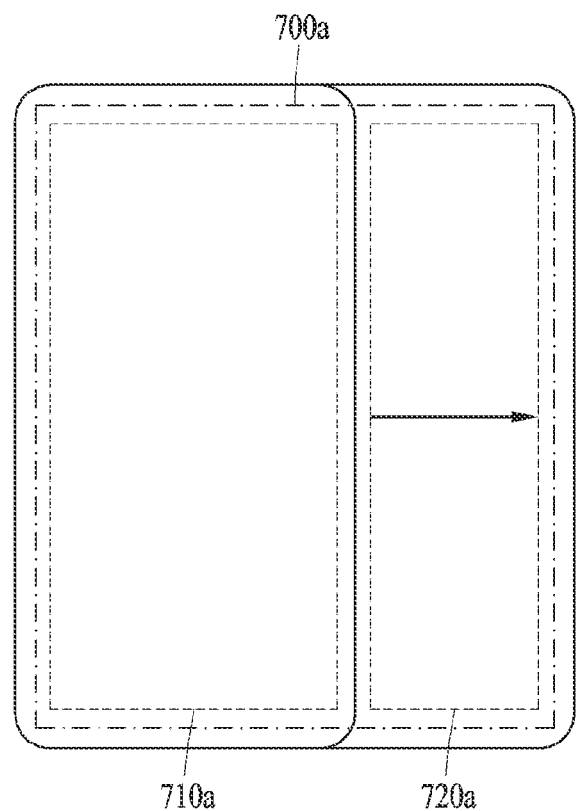
FIGS. 7A, 7B, 7C, 8A, 8B, 8C, 9, 10A and 10B are diagrams illustrating various examples of a flexible or expandable display according to various embodiments.
Figure 7B:
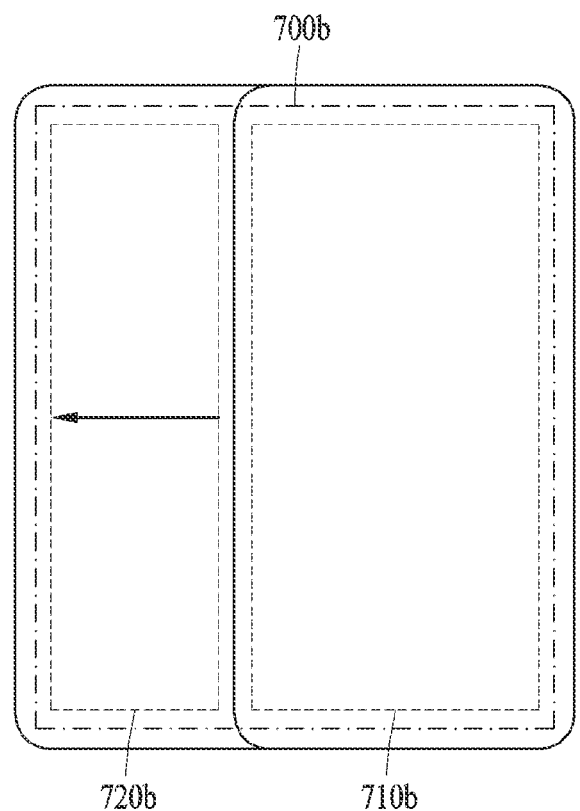
Figure 7C:
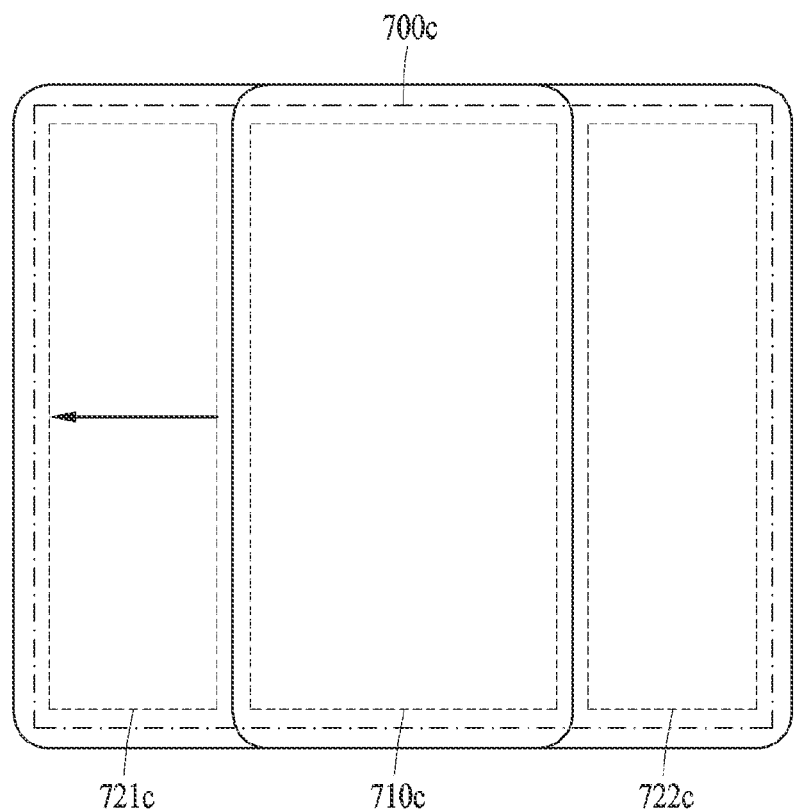
Figure 8A:
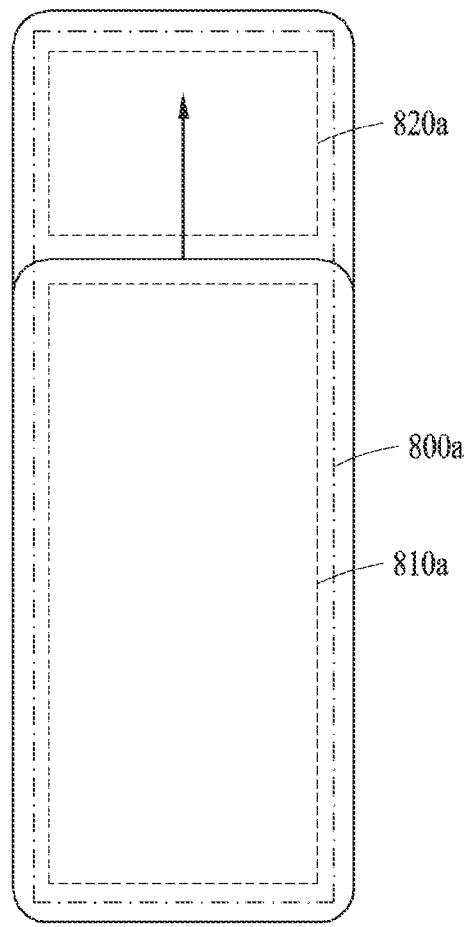
Figure 8B:
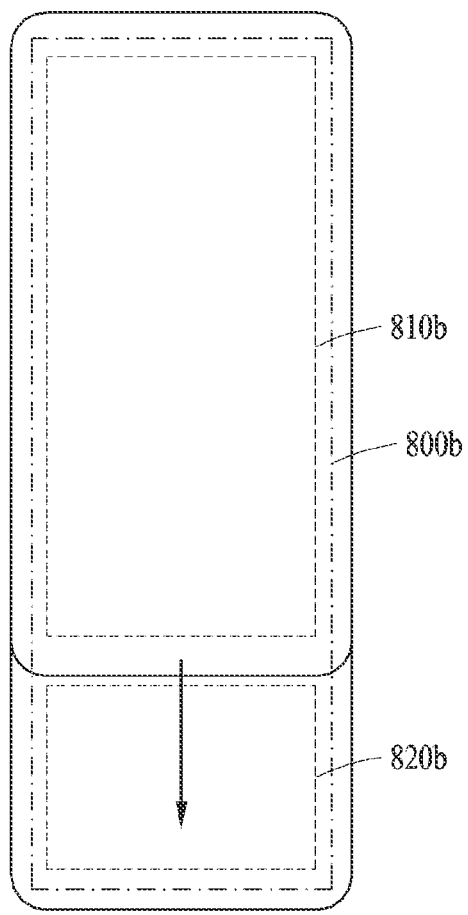
Figure 8C:
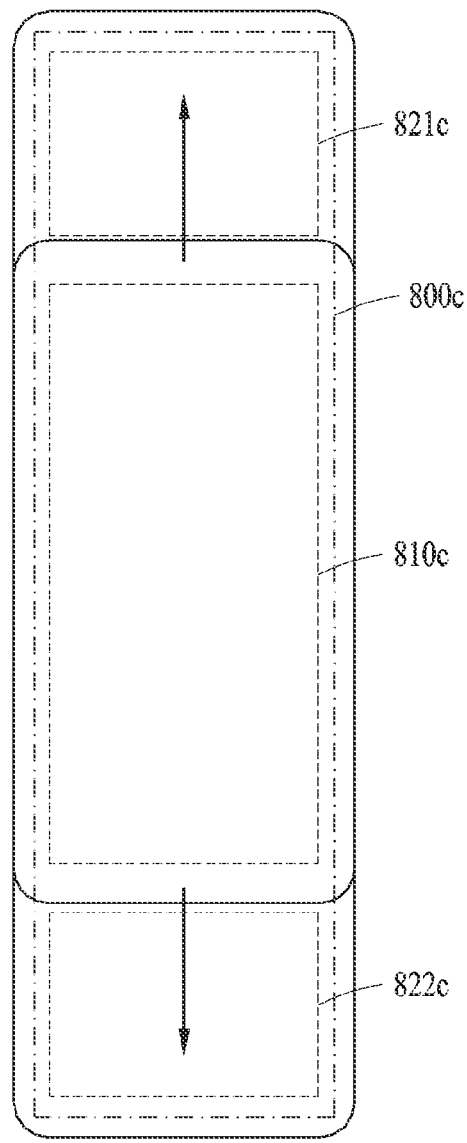

FIGS. 5A and 5B are front perspective views of an expandable electronic device in a closed state and an open state according to various embodiments. FIGS. 6A and 6B are rear perspective views of an expandable electronic device in a closed state and an open state according to various embodiments.

According to an example embodiment, an electronic device 500 illustrated in FIG. 5A may be at least partially similar to the electronic device 101 of FIG. 1 or may further include other components.

Referring to FIGS. 5A and 5B, and 6A and 6B, the electronic device 500 may include a first housing 510 and a second housing 520 that is at least partially movably connected to the first housing 510. The first housing 510 may include a first plate 511 and a first side frame 512 extending in substantially a perpendicular direction (e.g., a Z-axis direction) along an edge of the first plate 511. The first side frame 512 may include a first side surface 5121, a second side surface 5122 extending from one end of the first side surface 5121, and a third side surface 5123 extending from the other end of the first side surface 5121. The first housing 510 may include a first space that is at least partially closed from the outside through the first plate 511 and the first side frame 512.

The second housing 520 may include a second plate 521 and a second side frame 522 extending in substantially a perpendicular direction (e.g., the Z-axis direction) along an edge of the second plate 521. The second side frame 522 may include a fourth side surface 5221 facing a direction opposite to the first side surface 5121, a fifth side surface 5222 extending from one end of the fourth side surface 5221 and at least partially connected to the second side surface 5122, and a sixth side surface 5223 extending from the other end of the fourth side surface 5221 and at least partially connected to the third side surface 5123. For another example, the fourth side surface 5221 may extend from another structure that is not the second plate 521 and be connected to the second plate 521. The second housing 520 may include a second space that is at least partially closed from the outside through the second plate 521 and the second side frame 522. The first plate 511 and the second plate 521 may be disposed to form at least partially a rear surface of the electronic device 500. The first plate 511, the second plate 521, the first side frame 512, and the second side frame 522 may be formed of, for example, a polymer, coated or tinted glass, ceramic, metal (e.g., aluminum, stainless steel (STS), or magnesium), or a combination of at least two of the foregoing materials.

The electronic device 500 may include a flexible display 530 disposed to be supported by the first housing 510 and the second housing 520. The flexible display 530 may include a flat portion supported by the second housing 520 and a bendable portion extending from the flat portion and supported by the first housing 510. The bendable portion of the flexible display 530 may be disposed so as not to be exposed to the outside in the first space of the first housing 510 while the electronic device 500 is in the closed state, and may be exposed to the outside to extend from the flat portion while being supported by the first housing 510 while the electronic device 500 is in the open state. Thus, the electronic device 500 may be a rollable device of which a display screen of the flexible display 530 is expandable by an opening operation performed by a movement of the first housing 510 from the second housing 520.

The first housing 510 of the electronic device 500 may be at least partially inserted into the second space of the second housing 520, and be movably connected thereto in a direction indicated as ①. For example, in the closed state of the electronic device 500, a state in which the first housing 510 and the second housing 520 are connected such that the first side surface 5121 and the fourth side surface 5221 have a first distance d1 may be maintained. In the open state of the electronic device 500, a state in which the first housing 510 protrudes from the second housing 520 such that the first side surface 5121 protrudes from the fourth side surface 5221 by a predetermined distance d2 may be maintained. In the open state, the flexible display 530 may be supported by the first housing 510 and/or the second housing 520 such that both ends have a curved edge.

A state of the electronic device 500 may be changed to the open state and the closed state automatically through a driving unit disposed in the first space and/or the second space. For example, when detecting an event for the change to the open/closed state, a processor (e.g., the processor 120 of FIG. 1) of the electronic device 500 may control an operation of the first housing 510 through the driving unit. For another example, the first housing 510 may manually protrude from the second housing 520 by an operation performed by a user. In this example, the first housing 510 may protrude by an amount desired by the user, which may allow a screen of the flexible display 530 to vary to have various sizes of a displaying area. Thus, the processor of the electronic device 500 may display an object in various ways and control an application program to be executed, according to a size of the displaying area corresponding to a predetermined amount of protrusion of the first housing 510.

The electronic device 500 may include at least one of an input module 503, sound output modules 506 and 507, sensor modules 504 and 517, camera modules 505 and 516, a connector port 508, a key input device (not shown), or an indicator (not shown). For another example, the electronic device 500 may not include at least one of the foregoing components or may additionally include other components.

The input module 503 may include a microphone, for example. For another example, the input module 503 may include a plurality of microphones disposed to sense directions of sound. The sound output modules 506 and 507 may include speakers. For example, the speakers may include an external speaker (e.g., 506) and a receiver (e.g., 507) for calls. For another example, when an external speaker 506' is disposed in the first housing 510, it may be configured such that sound is output through a speaker hole (e.g., 506) formed in the second housing 520 in the closed state. The microphone or the connector port 508 may be formed to have substantially the same or similar configuration. For another example, the sound output modules 506 and 507 may include a speaker (e.g., a piezoelectric speaker) operating with a separate speaker hole excluded.

The sensor modules 504 and 517 may generate an electrical signal or a data value corresponding to an internal operation state or an external environment state of the electronic device 500. The sensor modules 504 and 517 may include, for example, a first sensor module 504 (e.g., a proximity sensor or an illuminance sensor) disposed on the front surface of the second housing 520 and/or a second sensor module 517 (e.g., a heart rate monitor (HRM)) disposed on the rear surface of the second housing 520. The first module 504 may be disposed under the flexible display 530 in the second housing 520. The first sensor module 504 may further include, for example, at least one of a proximity sensor, an illuminance sensor, a time of flight (TOF) sensor, an ultrasonic sensor, a fingerprint sensor, a gesture sensor, a gyro sensor, a barometric pressure sensor, a magnetic sensor, an acceleration sensor, a grip sensor, a color sensor, an IR sensor, a biosensor, a temperature sensor, or a humidity sensor.

The camera modules 505 and 516 may include a first camera module 505 disposed on the front surface of the second housing 520 of the electronic device 500 and a second camera module 516 disposed on the rear surface of the second housing 520. The electronic device 500 may include a flash 518 disposed around the second camera module 516. The camera modules 505 and 516 may include a single lens or a plurality of lenses, an image sensor, and/or an image signal processor (ISP). The first camera module 505 may be disposed under the flexible display 530 and configured to capture an image of an object through an activated area or a portion of the flexible display 530. The flash 518 may include an LED or a xenon lamp, for example. According to some example embodiments, two or more lenses (wide-angle and telephoto lenses) and image sensors may be disposed on one surface of the electronic device 500.

The electronic device 500 may include at least one antenna (not shown). For example, the antenna may wirelessly communicate with an external electronic device (e.g., the electronic device 104 of FIG. 1), or wirelessly transmit or receive power required for charging. The antenna may include, for example, a legacy antenna, an mmWave antenna, a near-field communication (NFC) antenna, a wireless charging antenna, and/or a magnetic secure transmission (MST) antenna. According to another example embodiment, an antenna structure may be formed with at least a portion of the first side frame 512 and/or the second side frame 522 that is formed of metal.

FIGS. 7A, 7B, 7C, 8A, 8B, 8C, 9, 10A and 10B are diagrams illustrating various examples of a flexible display according to various embodiments.

According to an example embodiment, a display module (e.g., the display module 160 of FIG. 1) of an electronic device (e.g., the electronic device 101 of FIG. 1) may be expandable in one direction. The display module may provide a screen in a default screen region before screen expansion, and provide a screen in an expanded screen region that is additionally expanded from the default screen region after the screen expansion. For example, the display module of the electronic device illustrated in FIG. 7A may have an expanded screen region 700*a* including a default screen region 710*a* and a screen region 720*a* added rightward. For example, the display module of the electronic device illustrated in FIG. 7B may have an expanded screen region 700*b* including a default screen region 710*b* and a screen region 720*b* added leftward. For example, the display module of the electronic device illustrated in FIG. 8A may have an expanded screen region 800*a* including a default screen region 810*a* and a screen region 820*a* added upward. For example, the display module of the electronic device illustrated in FIG. 8B may have an expanded screen region 800*b* including a default screen region 810*b* and a screen region 820*b* added downward.

The display module of the electronic device may also be expandable in both directions. For example, the display module of the electronic device illustrated in FIG. 7C may have an expanded screen region 700*c* including a default screen region 710*c*, a screen region 721*c* added leftward, and a screen region 722*c* added rightward. For example, the display module of the electronic device illustrated in FIG. 8C may have an expanded screen region 800*c* including a default screen region 810*c*, a screen region 821*c* added upward, and a screen region 822*c* added downward.

Figure 9:
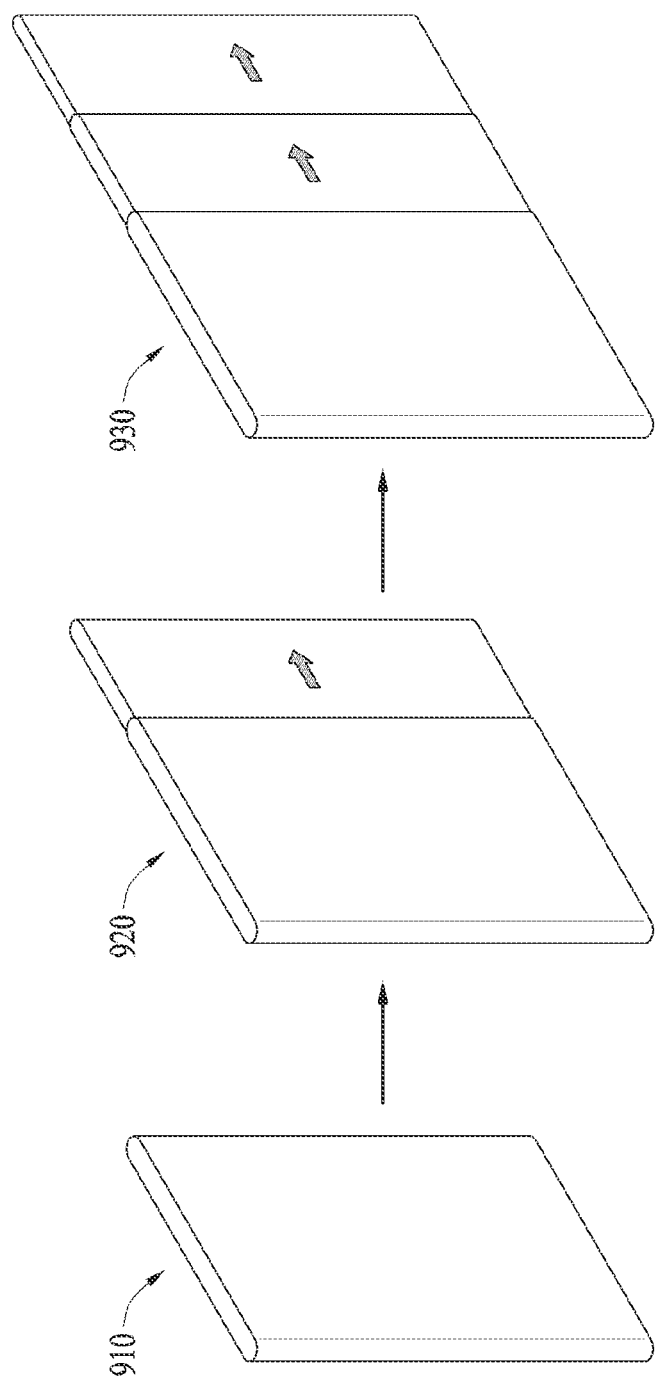

A screen region of the display module of the electronic device may be added in steps. For example, as illustrated in FIG. 9, the display module of the electronic device may provide a default screen region 910, a first expanded screen region 920 including the default screen region 910 and a first added region, and then a second expanded screen region 930 including the default screen region 910, the first added region, and a second added region. Although two-step screen expansion is described with reference to FIG. 9, examples are not limited thereto. The screen region of the display module may be expanded in N steps.

Figure 10A:
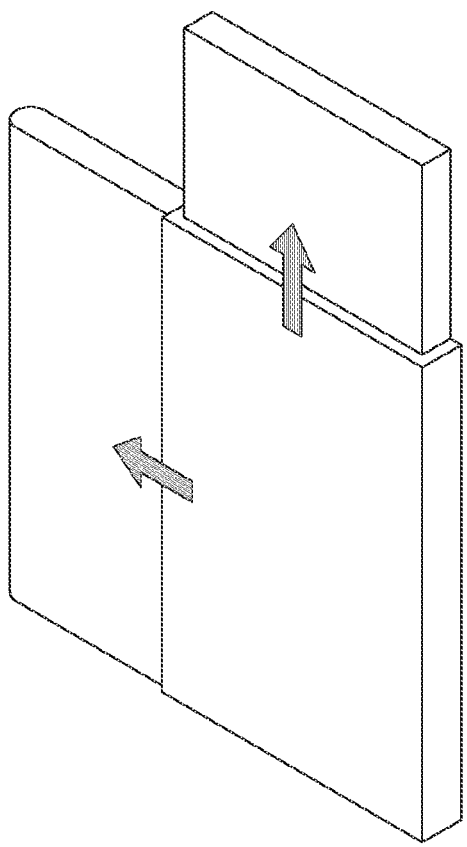
Figure 10B:
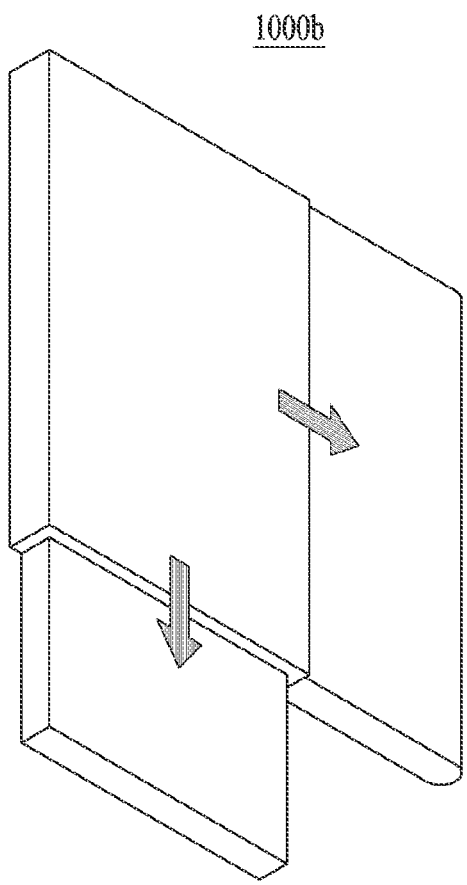

The screen region of the display module of the electronic device may also be expandable in one or more directions. For example, a display module of an electronic device 1000*a* illustrated in FIG. 10A may be expanded upward and leftward. For another example, a display module of an electronic device 1000*b* illustrated in FIG. 10B may be expanded rightward and downward. However, expansion directions illustrated in FIGS. 10A and 10B are provided merely as examples, and other example directions may also be applicable.

Although a flexible display of a rollable type is mainly described herein as an example of a screen-expandable display module, examples are not limited thereto.

Figure 11:
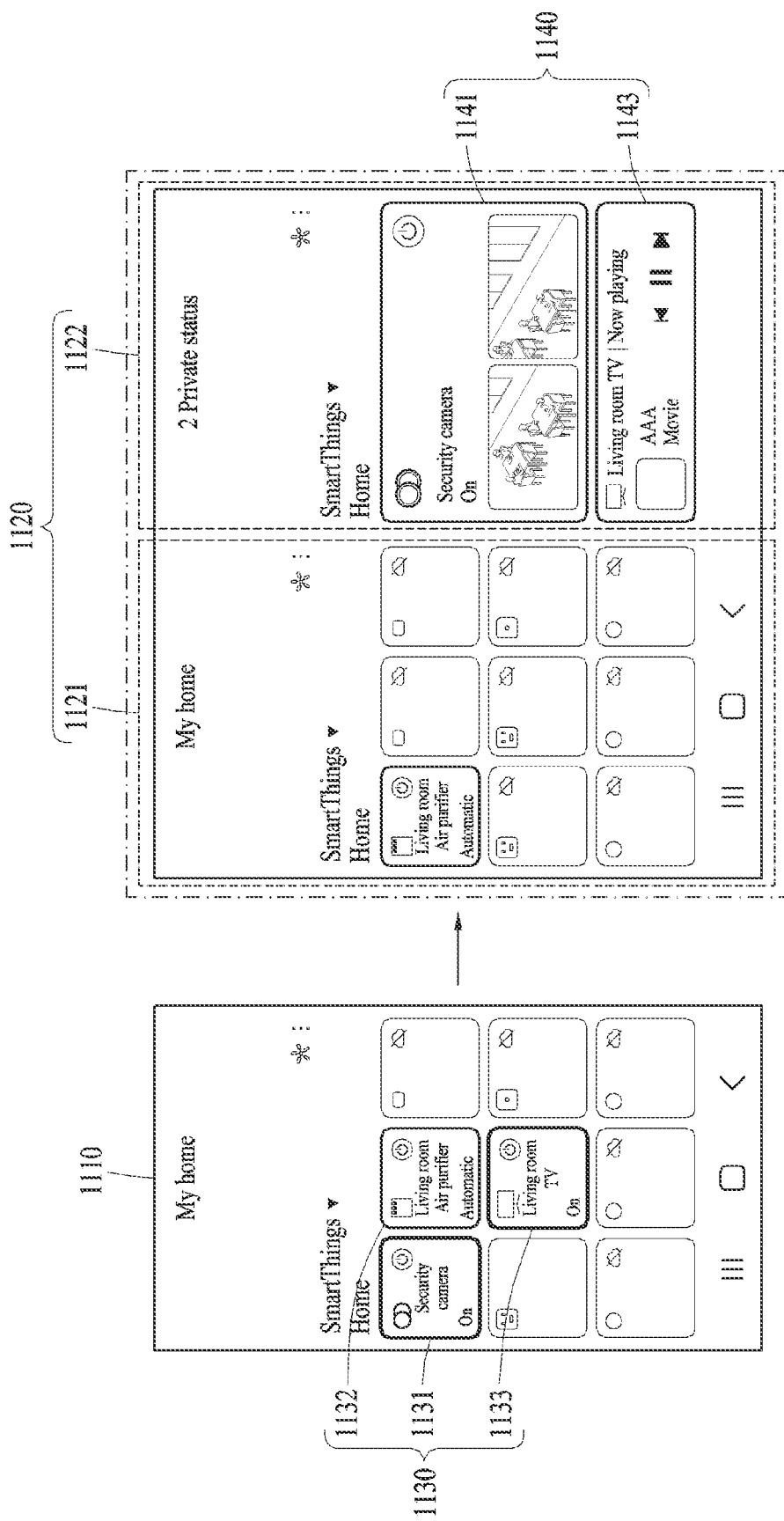
FIG. 11 is a diagram illustrating an example of providing private information in response to screen expansion according to various embodiments.

FIG. 11 is a diagram illustrating an example of providing private information in response to screen expansion according to various embodiments.

According to an example embodiment, an electronic device (e.g., the electronic device 101 of FIG. 1) may establish communication with one or more external devices 1130 through a communication module (e.g., the communication module 190 of FIG. 1). The external devices 1130 described herein may be devices (e.g., IoT devices) distinguished from the electronic device, and may provide a user with convenience and everyday life-related functions.

The electronic device may provide information of the external devices 1130 connected thereto. For example, the electronic device may visualize the information received from the external devices 1130 by outputting the information through a display module.

The electronic device may provide device information relating to the external devices 1130 in a default screen region 1110. The device information may be information indicating a state of an external device, which may be irrelevant to individual privacy or less related thereto. The electronic device may be paired with the external devices 1130 and visualize, in the default screen region 1110, device information of a currently connected external device among the paired external devices 1130. For example, the electronic device may output a graphic representation (e.g., a card type in FIG. 11) summarizing the device information of the currently connected external device. For example, as illustrated in FIG. 11, the electronic device may visualize device information of each of a first external device 1131, a second external device 1132, and a third external device 1133 that are connected to the external device. In this example, the electronic device may output a power supply state (e.g., power on/off) of each of the first external device 1131, the second external device 1132, and the third external device 1133. Additionally, the electronic device may provide, through the graphic representation, an interface for giving a command for an operation (e.g., turning off power) to the currently connected external device. The electronic device may output only the device information in the default screen region 1110 while limiting exposure of information relating to the privacy of the user.

In response to screen expansion, the electronic device may provide private information of the external devices 1130 in an expanded screen region 1120. For example, the electronic device may provide the private information of the external devices 1130 in an added region 1122 of the expanded screen region 1120. As illustrated, the electronic device may provide private information 1140 of only an external device from which the private information 1140 occurs among the external devices 1130. The electronic device may suspend providing device information of the external device from which the private information 1140 occurs in a default screen region 1121 of the expanded screen region 1120, and provide the private information 1140 of the external device in the added region 1122 of the expanded screen region 1120. For an external device from which private information does not occur, the electronic device may continue providing device information of the external device in the default screen region 1121. For example, as illustrated in FIG. 11, the electronic device may provide private information 1141 of the first external device 1131 and private information 1143 of the third external device 1133. In the meantime, as illustrated in FIG. 11, the electronic device may provide device information of the second external device 1132 in the default screen region 1121 of the expanded screen region 1120. However, examples are not limited to the foregoing example and the electronic device may additionally provide visualized private information of an external device from which private information occurs in the added region 1122 while providing device information of the external device in the default screen region 1121.

Thus, instead of providing the private information 1140 occurring in the external devices 1130 upon activation of a screen relating to the external devices 1130, the electronic device may limit exposure of the private information 1140 before screen expansion. For example, the electronic device may prevent/reduce an unnecessary exposure of sensitive information of an individual in a default screen region. In addition, the electronic device may provide device information in the default screen region of an expanded screen region in response to screen expansion and provide private information in an added region of the same expanded screen region, thereby providing intuitive user convenience to the user. For example, when the user checks a state of the external devices 1130, the electronic device may add the private information onto the screen without a screen shift (e.g., an entry into a detailed device information screen), and visualize device information and the private information simultaneously while preventing and/or reducing an immediate exposure of sensitive information.

For example, information collected from the external devices 1130 may be classified into first privacy-level information (or non-sensitive information) (e.g., irrelevant or less related to individual privacy) and second privacy-level information (or sensitive information) (e.g., closely related to individual privacy). For example, when an external device is an IoT device, information may occur from the device that is closely related to a residential environment or personal life of the user, and thus the second privacy-level information may occur frequently. In this example, the electronic device may selectively provide second privacy-level private information to the user based on screen expansion, while providing first privacy-level device information. To the user, the private information may be exposed in response to the screen expansion after being in a hidden region, and thus the electronic device may provide more intuitive and optimal user convenience to the user.

However, a privacy level may not be limited to the foregoing two levels—first privacy-level and second privacy-level—but be classified into N levels. For example, when screen expansion is divided into N steps as illustrated in FIG. 9, information of a privacy level corresponding to a degree of a screen of the electronic device being expanded may be gradually added to an expanded screen region.

Figure 12:
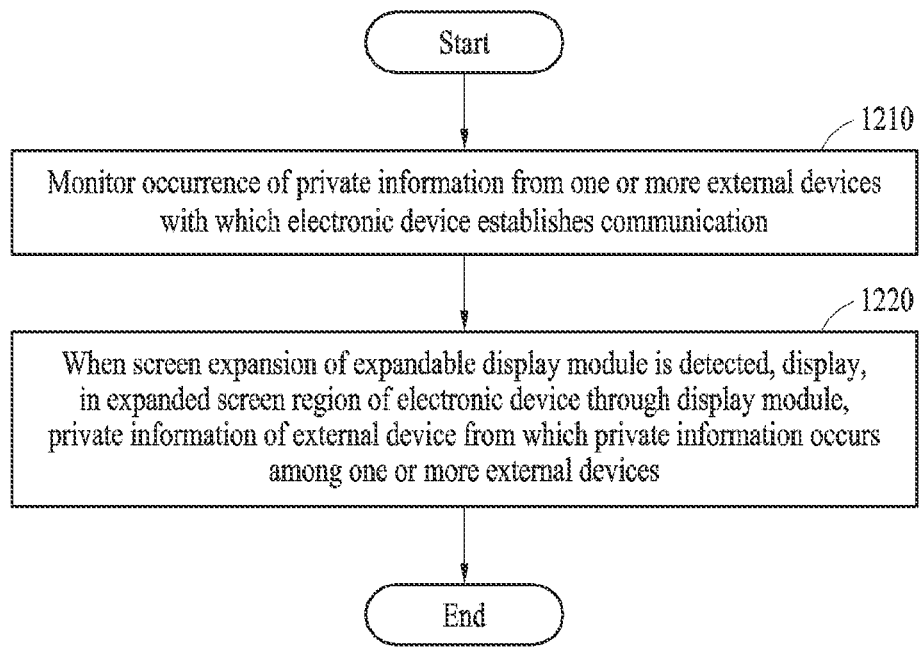
FIG. 12 is a flowchart illustrating an example method of providing private information according to various embodiments.

FIG. 12 is a flowchart illustrating an example method of providing private information according to various embodiments.

Referring to FIG. 12, in operation 1210, an electronic device may monitor an occurrence of private information from one or more external devices with which the electronic device establishes or has established communication. The private information may refer, for example, to information based on at least one of a personal activity and a personal area. For example, the private information, which is closely or highly related to individual privacy, may be generated by the personal activity and/or generated in the personal area. The private information may include at least one of or a combination of at least two of location information, image information, sound information, bioinformation, environment information, and safety information that occur in relation to a personal activity and a personal area of a user of the electronic device. The personal activity, which is an activity performed or triggered by the user of the electronic device or another person, may include a movement of an individual, a social activity of the individual, a physical activity of the individual, bioinformation (e.g., electrocardiogram (ECG) signal, pulse, respiration, oxygen saturation, blood pressure, and blood sugar) of the individual, and other activities (e.g., watching movie and listening to music) of the individual. The personal area may include an area set by the user, for example, a location of an individual, a residential place of the individual, a place of stay of the individual, and an area in which a personal life of the individual occurs. The electronic device may receive private information from an external device from which an occurrence of such private information is detected. Examples of the private information will be described in greater detail below with reference to FIGS. 15A, 15B and 15C.

In operation 1220, when screen expansion of an expandable display module is detected, the electronic device may display the private information of the external device from which the private information occurs among the external devices in an expanded screen region of the electronic device through the display module. As described above, the electronic device may provide the private information received from the external device in an added region of the expanded screen region. However, examples are not limited thereto.

The providing of the private information by the electronic device will be described in greater detail below.

Figure 13:
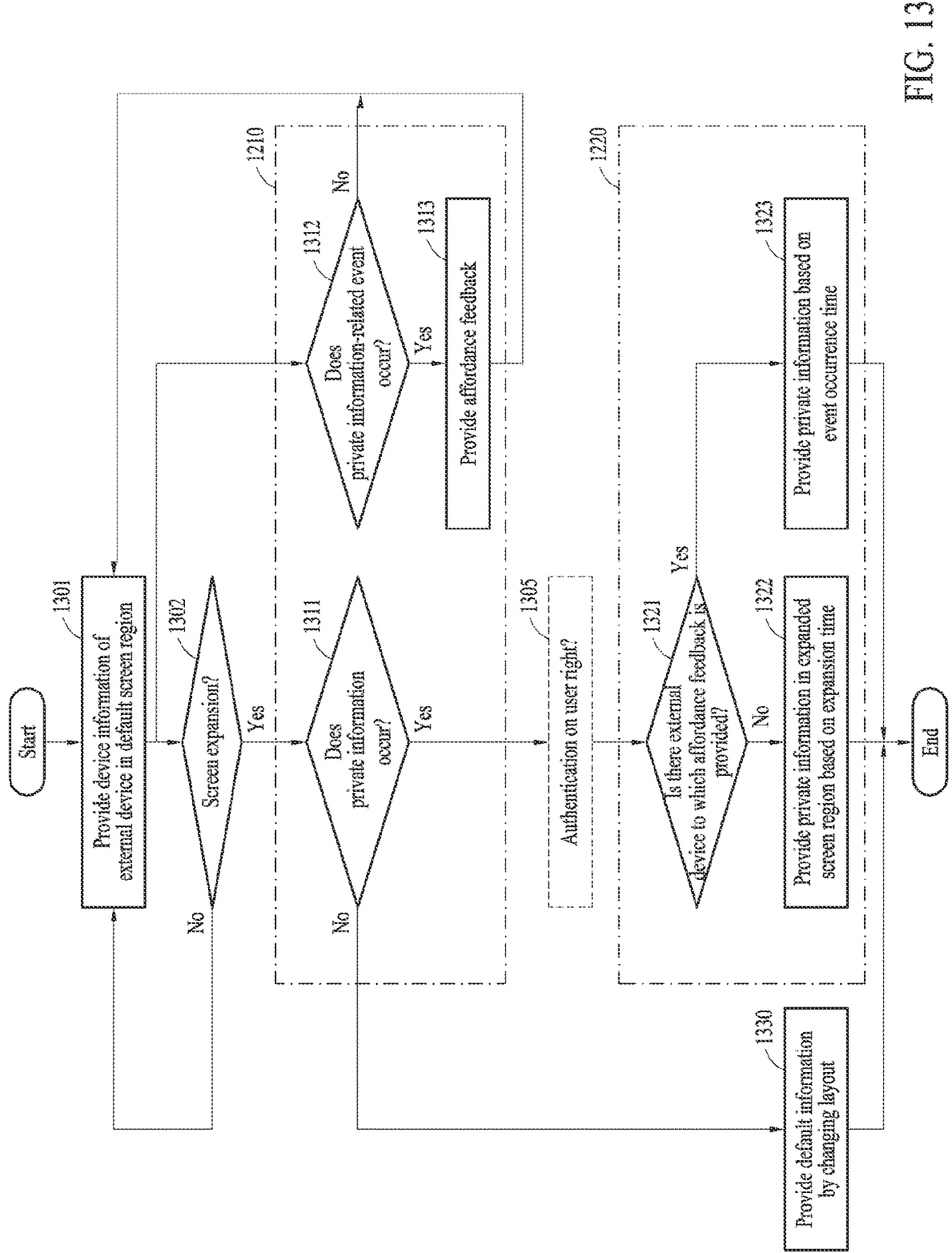
FIG. 13 is a flowchart illustrating an example operation of providing private information through affordance feedback in response to an occurrence of an event according to various embodiments.
Figure 14:
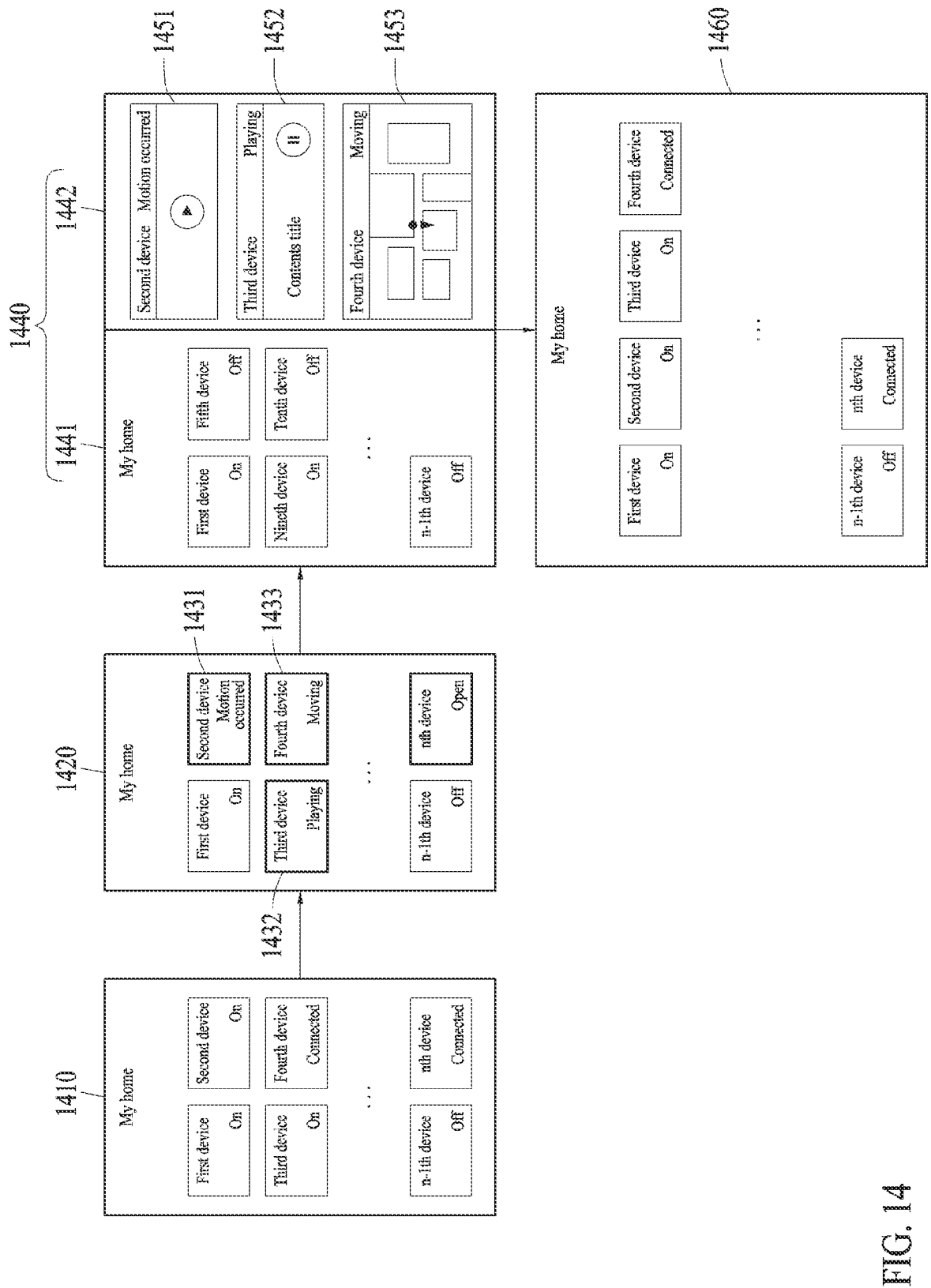
FIG. 14 is a diagram illustrating an example operation of providing private information through affordance feedback in response to an occurrence of an event according to various embodiments.

FIG. 13 is a flowchart illustrating an example operation of providing private information through affordance feedback in response to an occurrence of an event according to various embodiments. FIG. 14 is a diagram illustrating an example operation of providing private information through affordance feedback in response to an occurrence of an event according to various embodiments.

Referring to FIG. 13, in operation 1301, an electronic device (e.g., the electronic device 101 of FIG. 1) may provide device information of an external device in a default screen region. The electronic device may receive device information from a currently connected external device and output the received device information. The device information may be information about a state of the external device and may include, for example, information about a power state (e.g., power on or off), a connection state (e.g., connection signal strength with respect to the electronic device), an operation state (e.g., play, pause, and end of a content including a video and music), and an open/closed state (e.g., a door open or closed state). However, the device information and the information related to an external device output into the default screen region are not limited to the foregoing example. For example, the electronic device may provide first privacy-level information (e.g., information of a level irrelevant or less related to privacy of a user) in the default screen region. For example, as illustrated in FIG. 14, the electronic device may provide device information of external devices in a default screen region 1410 before screen expansion.

In operation 1302, the electronic device may determine whether screen expansion occurs. For example, the electronic device may detect whether a screen of a flexible display is expanded by a change in the device (e.g., opening by a movement of a housing of the electronic device as described above with reference to FIGS. 5A and 5B). Although operation 1302 of detecting the screen expansion is illustrated as being performed or occurring before operation 1210 (e.g., including operations 1311, 1312 and 1313) of monitoring an occurrence of private information, examples are not limited thereto. Operation 1302 may be performed or occur concurrently with or after operation 1210. When the screen is not expanded, the electronic device may continue outputting the device information in the default screen region until the screen is expanded.

In operation 1210, the electronic device may monitor private information in response to the screen expansion being detected. For example, in operation 1311, the electronic device may monitor whether private information occurs from one or more external devices in at least one timing or a combined timing of at least two of a predetermined time period, a screen expansion detection time at which the screen expansion is detected, and an event occurrence time at which a private information-related event occurs. The electronic device may, in each predetermined time period, verify whether private information occurs in a connected external device and request the external device for the private information, and receive a result thereof. The electronic device may request the external device for a check of whether the private information occurs at the screen expansion detection time. In addition, the electronic device may receive a report of the occurrence of the private information from the external device at a timing corresponding to at least one or a combination of at least two of the predetermined time period, the screen expansion detection time, and the event occurrence time.

Even though a private information-related event occurs, private information itself may not occur. For example, when a security camera detects a movement, the security camera may transmit, to the electronic device, a report of an event related to the movement. When the security camera does not include an internal memory space itself or has an insufficient memory space, the security camera may fail to capture an image at the event occurrence time. Thus, the screen expansion may occur in operation 1302 while affordance feedback is being provided in operation 1313 after the event occurs in operation 1312. Subsequently, in operation 1311, when the private information is not generated although the event occurs as described above, the private information to be provided may not be present, and thus the electronic device may provide default information by changing a layout in operation 1330.

In operation 1312, the electronic device may monitor whether the private information-related event occurs. The private information-related event may refer to an event defined based on at least one of or a combination of at least two of a personal activity, a personal area, and a preset time. The event may include, for example, an occurrence of a personal activity, an occurrence of a personal activity in a personal area (e.g., an activity performed by the user and/or another person), an occurrence of an operation by an object in a personal area, a personal activity at a preset time, collection of information in a personal area at a preset time, and collection of information at a preset time. However, the private information-related event is not limited to the foregoing examples. When the event does not occur, the electronic device may continue providing the device information in the default screen region in operation 1301.

Examples of the private information and the private information-related event may be indicated in Table 1 below.

TABLE 1

| Device type | Device information | Private information | Event |
|---|---|---|---|
| General home appliance | On/off | n/a | n/a |
| Security camera | On/off | Image | Object motion detection, sound detection |
| TV, headphone, speaker, AI speaker, soundbar | On/off Play/pause | Content/image in playing | Start playing content/ image |
| Tag device | Connect/disconnect | Location information of tag device | Start moving/ moving, deviating from certain area |

TABLE 1-continued

| Device type | Device information | Private information | Event |
|---|---|---|---|
| Movable IoT device including vehicle | On/off Connect/disconnect | User location | Location change |
| Smartwatch, wearable device | On/off Connect/disconnect | Heart rate, step count | Preset timeslot, measured biometric value reaching threshold value |
| Robot cleaner | On/off Connect/disconnect | Cleaned area | Start and end cleaning |
| Temperature measurer, moisture measurer | On/off Connect/disconnect | Temperature and humidity of installed location (e.g., individual room) | Reaching threshold temperature or humidity, preset timeslot |
| Open door sensor, door lock | Connect/disconnect | Open state/ closed state | Opening/ closing occurred |

As indicated in Table 1 above, private information of a security camera may correspond to image information and sound information that are collected from a personal area, and an event of the security camera may be an occurrence of an object motion and sound in the personal area in which the security camera is installed. Private information of a television (TV) may correspond to a type of a content played according to a personal activity of watching the TV, and an event of the TV may be starting and ending the play of the content. Private information of a vehicle may correspond to a location of a user according to a personal activity, and an event of the vehicle may be a change in the location induced by the personal activity. Private information of a smartwatch including a biosensor may correspond to bioinformation measured by the biosensor, and an event of the smartwatch may be reaching a preset time or a measured value (e.g., blood sugar) reaching a threshold value (e.g., a dangerous blood sugar level). Private information of a robot cleaner may correspond to an area cleaned by an operation performed in a personal area, and an event of the robot cleaner may be starting and ending cleaning. Private information of a temperature measurer may correspond to a temperature of a personal area in which the temperature measurer is installed, and an event of the temperature measurer may be a temperature of a room reaching a threshold temperature. Private information of an open door sensor may correspond to an opening or closed state of a door in which the open door sensor is installed, and an event of the open door sensor may be the door opening or closed. General home appliances may include, for example, an air conditioner, a steam closet, a washing machine, a drying machine, a dishwasher, and a refrigerator. However, items indicated in Table 1 above are provided merely as examples, and the device type, the device information, the private information, and the event are not limited thereto.

For example, when an event occurs in response to screen expansion being detected, private information may be provided based on an event occurrence time at which the event occurs. When the event does not occur, the private information may be provided based on an expansion time. The foregoing will be described in greater detail below along with the following description of operations 1321, 1322, and 1323.

Although a private information-related event is mainly described herein, examples are not limited thereto. For example, the electronic device may also monitor whether an urgent event occurs. The urgent event may be an event that requires urgency for among operations performed in an external device, information to be collected, and/or occurring events, and may be defined by the user and/or a service provider. When an urgent event for an external device is detected, the electronic device may provide urgent affordance feedback to the external device. The urgent affordance feedback may be provided in a visually different form from the affordance feedback provided in operation 1313 in FIG. 13, but examples are not limited thereto. For example, the urgent affordance feedback may be provided in the same or similar form that is not distinguishable from that of the affordance feedback. The urgent affordance feedback may include feedback on state information and/or collected information of an external device.

For example, motion detection of a motion sensor, button push of a doorbell, smoke detection of a smoke detector, and timer expiration of kitchen appliances (e.g., an oven, a gas stove, an induction heater, etc.) may be defined as the urgent event. When receiving the urgent event from an external device, although it is not related to private information, the electronic device may provide the urgent affordance feedback. In response to screen expansion when the urgent event occurs, the electronic device may provide detailed information in an expanded screen region based on a time at which the urgent event occurs. For example, for the motion detection of the motion sensor, the electronic device may provide, in the expanded screen region, a time at which a motion occurs as detailed information. For the button push of the doorbell, the electronic device may provide, in the expanded screen region, a time at which the button push occurs. For the smoke detection of the smoke detector, the electronic device may provide, in the expanded screen region, a time at which smoke is detected. For the timer expiration of the kitchen appliances, the electronic device may provide, in the expanded screen region, a timer expiration time, a cooking time, and/or a cooking temperature.

In response to an occurrence of an event, the electronic device may provide the affordance feedback in operation 1313. For example, in response to an occurrence of an event defined based on at least one of or a combination of at least two of a personal activity, a personal area, and a preset time, a processor of the electronic device may provide, in the default screen region, the affordance feedback that requests a check for private information of an external device from which the event occurs among one or more external devices. For example, as illustrated in FIG. 14, the electronic device may provide the affordance feedback on a second external device 1431, a third external device 1432, and a fourth external device 1433 from which an event occurs among connected external devices on screen 1420. Although the affordance feedback is illustrated in FIG. 14 as being an operation of changing a graphic representation indicating an external device from which an event occurs, other examples of the affordance feedback will be described below with reference to FIGS. 15A, 15B and 15C.

In operation 1305, the electronic device may perform authentication on a right of the user. When the screen expansion is detected, the electronic device may perform authentication to verify whether the user is a genuine user having a right of access to an external device from which private information occurs. For example, the electronic device may determine whether a current user accessing the private information of the external device is matched to a user registered in advance in the electronic device. The electronic device may determine whether an authentication input obtained from the user is matched to pre-registered authentication information. The authentication input may refer to an input for authenticating identification of the user and may include, for example, at least one of or a combination of at least two of a biometric input (e.g., a fingerprint, a face input, an iris input, and a vein input), a personal identification number (PIN), and a password. The registered authentication information may include at least one of or a combination of at least two of previously registered bioinformation (e.g., a registered fingerprint, a registered face, a registered iris, and a registered vein), a registered PIN, and a registered password. For example, the electronic device may obtain a fingerprint input from the user and determine whether the obtained fingerprint input is matched to the registered fingerprint information. When the fingerprint input is matched to the registered fingerprint information, the electronic device may determine that the current user is the registered user.

The electronic device may determine whether the registered user has a right of access to an external device. When the user is authenticated as having a right of access to an electronic device from which private information occurs, the electronic device may provide the private information in the expanded screen region.

In addition, a right of access to some of a plurality of external devices may be set for only some users among registered users. The processor of the electronic device may provide the user with private information of an external device to which a right of access is allowed among external devices from which private information occurs, and may limit provision of private information of an external device to which the right of access is not allowed among the external devices from which private information occurs. Thus, even when the screen is expanded in operation 1220, the electronic device may provide private information of some external devices to which the right of access is allowed to the user among a plurality of external devices, and block provision of private information of remaining external devices to which the right of access is not allowed to the user.

In operation 1321, the electronic device may determine whether there is an external device to which the affordance feedback is provided. As to be described later, the electronic device may provide private information of an external device (e.g., an external device from which a private information-related event occurs) to which the affordance feedback is provided and private information of an external device (e.g., an external device from which only private information occurs without an event) to which the affordance feedback is not provided, at different times.

In operation 1322, for the external device from which the private information-related event does not occur, the electronic device may provide private information based on a screen expansion detection time at which the screen expansion is detected, until the screen expansion is detected. For example, the electronic device may provide the private information received from the external device in the expanded screen region from the screen expansion detection time. For another example, the electronic device may receive the private information collected from the external device until the screen expansion detection time, and provide the private information in the expanded screen region.

In operation 1323, for an external device to which the affordance feedback is applied among one or more external devices, the electronic device may provide private information based on an event occurrence time. For example, the electronic device may provide the private information generated at the event occurrence time in the expanded screen region. For another example, the electronic device may receive the private information collected from the external device until the event occurrence time, and provide the private information in the expanded screen region. Thus, when the screen is expanded, the electronic device may provide the user with information of a portion (e.g., a time and/or time interval for which a check is required) of the private information for which an urgent check by the user is required, thereby improving user convenience and security. For example, as illustrated in FIG. 14, the electronic device may provide, in an added region 1442, private information 1451, 1452, and 1453 of external devices from which an event occurs based on an event occurrence time, while providing device information of external devices in a default screen region 1441 of an expanded screen region 1440. For example, for the second external device 1431 which is a security camera, the electronic device may provide, in the added region 1442, image information captured for a preset time length based on a time at which an object motion is detected. For another example, for the third external device 1432 which is a TV, the electronic device may provide information of a playing content based on a time at which the content is started playing. For still another example, for the fourth external device 1433 which is a tag device, the electronic device may provide current location information of the tag device based on a time at which a location is changed.

In operation 1330, the electronic device may provide device information of external devices by changing a layout. For example, when an occurrence of private information is not detected from all of one or more external devices, the electronic device may arrange graphic representations corresponding to the external devices based on the expanded screen region. Although a case where the electronic device provides device information in the expanded screen region when private information does not occur is described with reference to FIG. 13, examples are not limited thereto. As illustrated in FIG. 14, when the user completes a check for private information, the electronic device may arrange the device information of the external devices in the expanded screen region based on a layout 1460. For example, the electronic device may expose all the private information of external devices from which an event occurs in the expanded screen region, simultaneously and/or sequentially (e.g., through automatic scrolling or scrolling by an input from the user). In this example, when there is no new private information, the electronic device may change the layout 1460 based on the expanded screen region. For example, when the private information based on the event is all checked by the user and viewing the private information is completed, the electronic device may adjust the layout 1460 according to the expanded screen region.

Figure 15A:
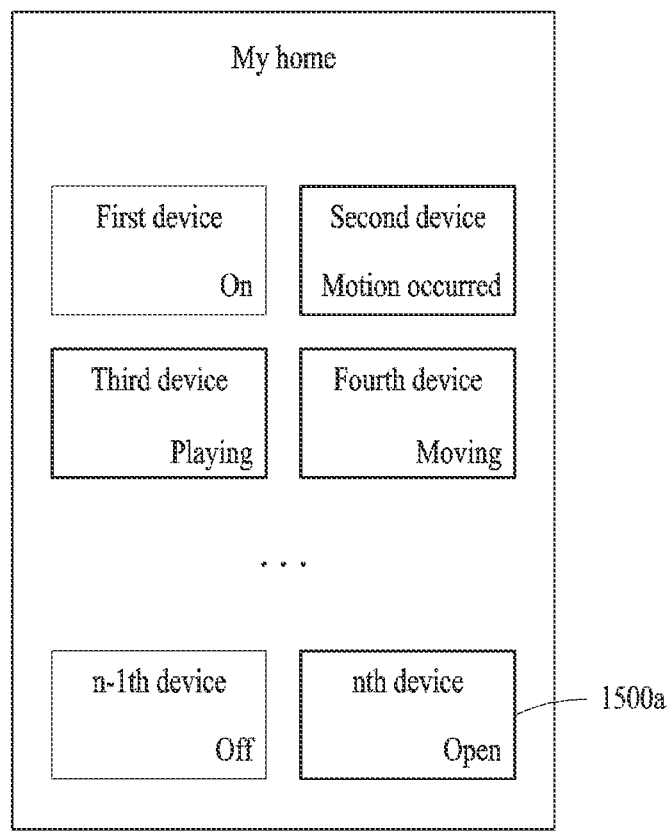
FIGS. 15A, 15B and 15C are diagrams illustrating examples of affordance feedback according to various embodiments.
Figure 15B:
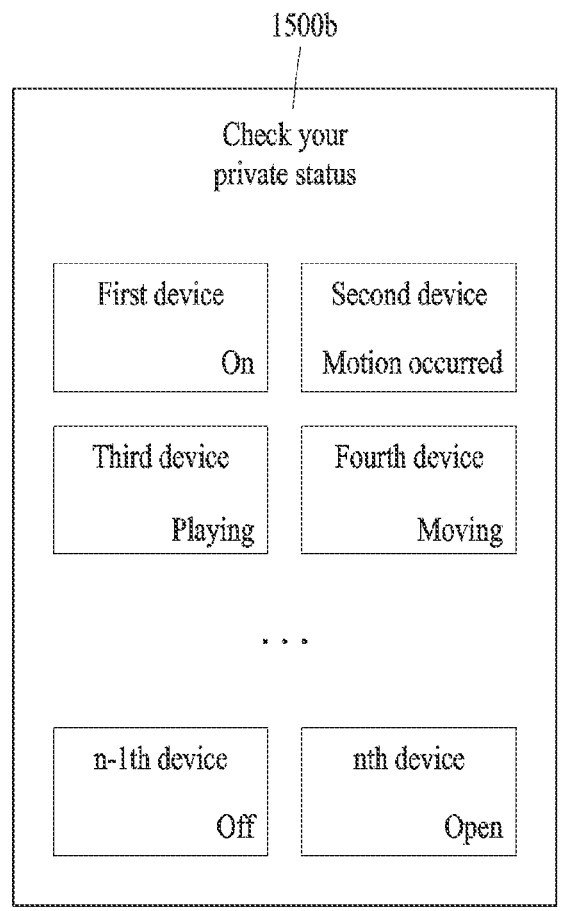
Figure 15C:
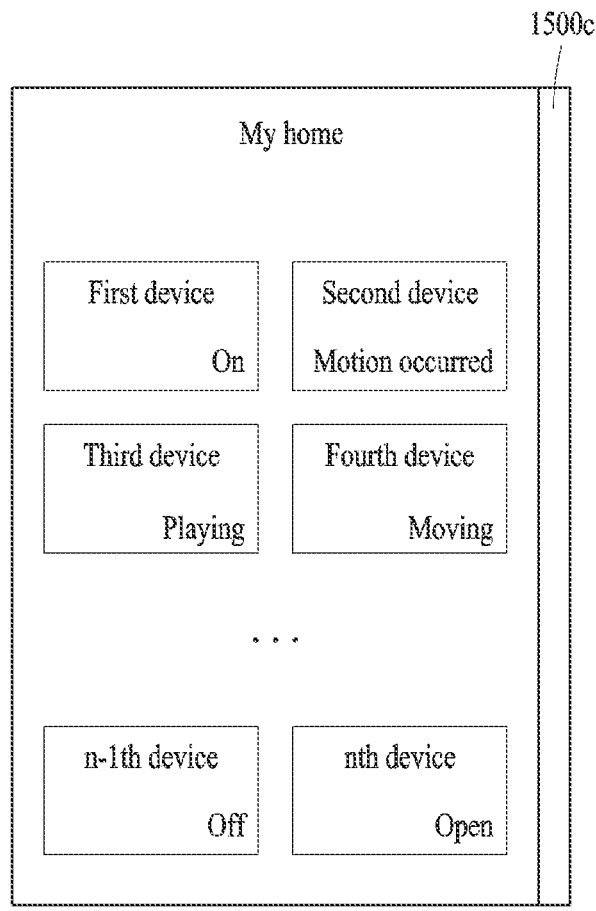

FIGS. 15A, 15B and 15C are diagrams illustrating examples of affordance feedback according to various embodiments.

According to an example embodiment, an electronic device (e.g., the electronic device 101 of FIG. 1) may apply affordance feedback to an external device from which an event occurs in operation 1313 described above with reference to FIG. 13. For example, a processor of the electronic device may provide, as the affordance feedback, at least one of or a combination of at least two of a change in a graphic representation indicating the external device from which the event occurs, an additional graphic representation inducing a check for the external device from which the event occurs, tactile feedback, and a sound signal, in a default screen region. For example, the electronic device may change a color 1500a (e.g., add a highlighter) of a graphic representation indicating an external device as illustrated in FIG. 15A, visualize a text object 1500b as an additional graphic representation requesting a check for the external device as illustrated in FIG. 15B, or apply a visual effect 1500c inducing an attention of a user on one side (e.g., a right side in FIG. 15C) of the default screen region as illustrated in FIG. 15C. However, the affordance feedback is not limited to the illustrated visual information. For example, when the occurrence of the event is detected, the electronic device may provide vibration as tactile information or play, as a sound signal, sound information (e.g., voice) indicating the external device from which the event occurs.

Figure 16:
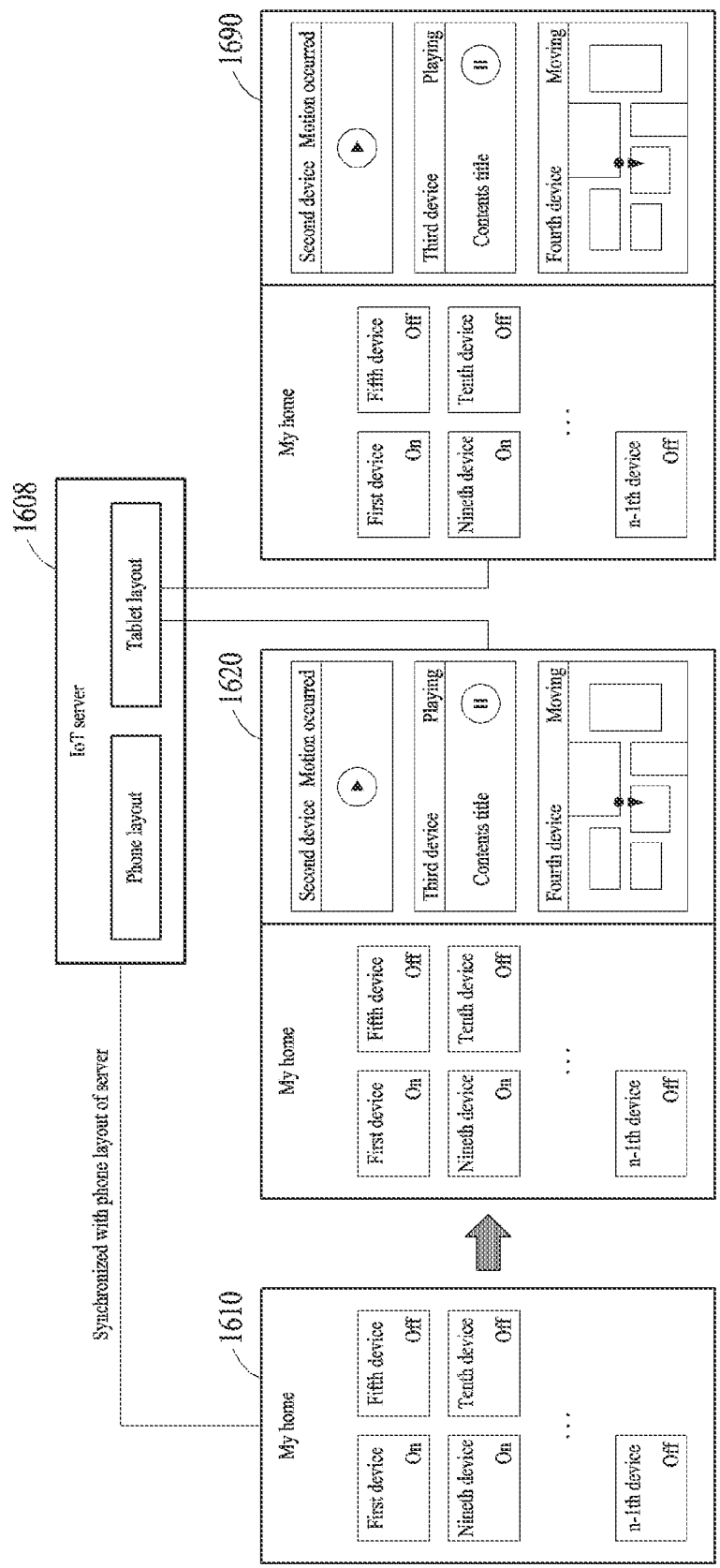
FIG. 16 is a diagram illustrating an example of sharing a layout with other devices according to various embodiments.

FIG. 16 is a diagram illustrating an example of sharing a layout with other devices according to various embodiments.

According to an example embodiment, a processor of an electronic device (e.g., the electronic device 101 of FIG. 1) may share, with another electronic device, an arrangement of private information output into an expanded screen region. Referring to FIG. 16, the electronic device may customize an arrangement of private information in an expanded screen region 1620. For example, the electronic device may set an order and/or position in which the private information is to be arranged in the expanded screen region 1620 according to an input from a user. A layout of the private information may include the order and/or position in which the private information is arranged. The electronic device may upload the layout of the private information in an IoT server 1608 (e.g., the server 108 of FIG. 1) to share the layout. The other electronic device accessed with the same user account as the electronic device may download the layout of the private information from the IoT server 1608, and provide the private information according to the downloaded layout in an expanded screen region 1690.

An IoT application that simultaneously provides a plurality of device information and control functions on one screen may have a complicated screen, and a user requirement and a usage form based on a size of the screen in the IoT application may vary according to a situation where a complicated task is performed. The electronic device may conveniently provide the same user experience in various devices while satisfying a user preference for separately customizing a screen of a phone or a tablet.

In addition, the electronic device may synchronize, with the IoT server 1608, a layout of an arrangement of device information in a default screen region 1610. For example, the other electronic device accessed with the same user account may also provide the device information in the same or similar layout in the default screen region 1610.

Figure 17:
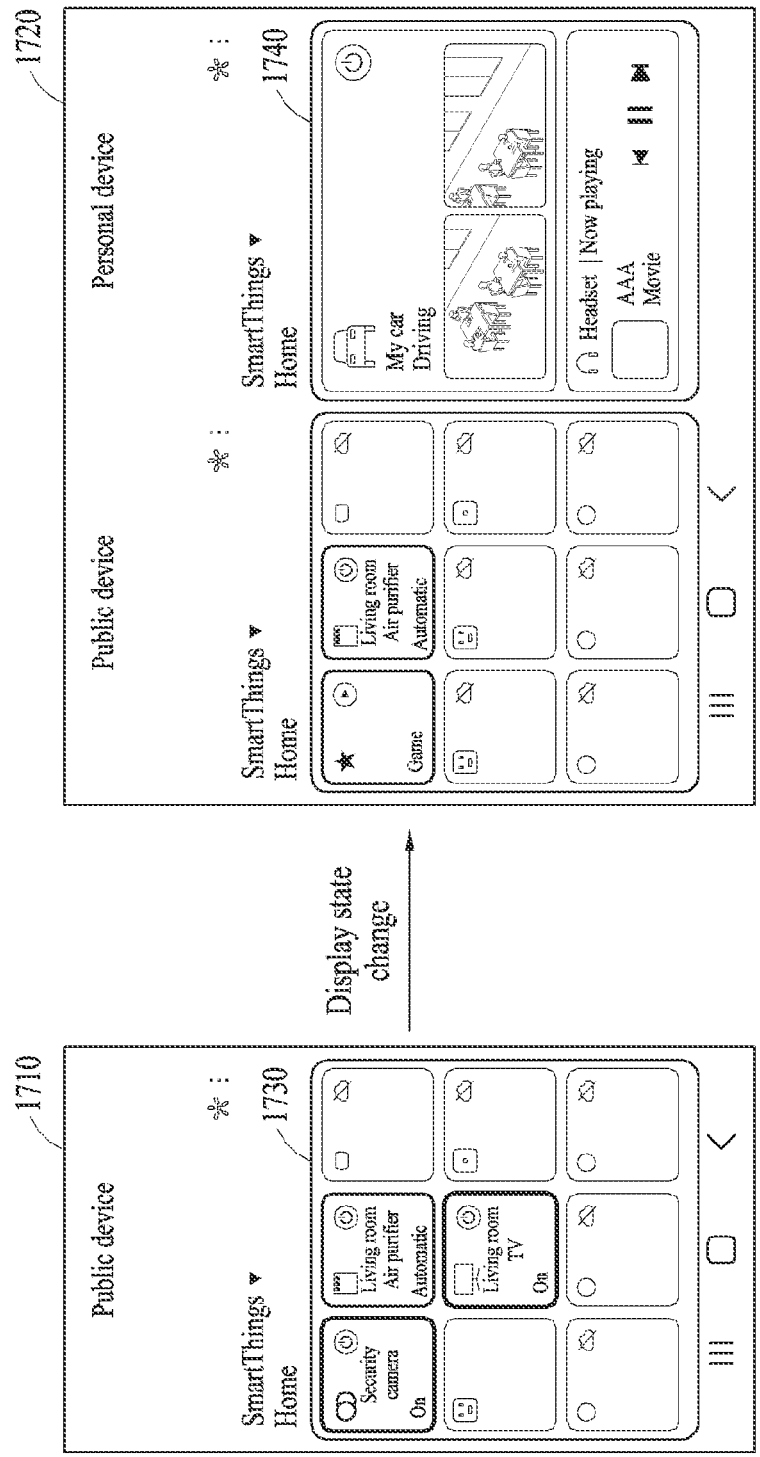
FIG. 17 is a diagram illustrating an example operation of providing device information according to security of an external device according to various embodiments.

FIG. 17 is a diagram illustrating an example operation of providing device information according to security of an external device according to various embodiments.

According to an example embodiment, a processor of an electronic device may provide public device-related information 1730 relating to a public device among one or more external devices in a default screen region 1710. When screen expansion is detected, the electronic device may provide personal device-related information 1740 relating to a personal device among the external devices in an expanded screen region 1720. The public device described herein may refer to an external device (e.g., an AI speaker and home appliances) usable by common users (e.g., family users), and the personal device described herein may refer to an external device (e.g., a vehicle and headsets) dedicated to an individual user. The public device-related information 1730 may be device information relating to the public device, and the private device-related information 1740 may include private information occurring in a personal device and/or private information generated by an event.

Thus, the electronic device may hide private information relating to the personal device until there is screen expansion, and provide the private information relating to the personal device after the screen expansion.

In addition, the processor of the electronic device may provide, in the default screen region 1710, information relating to an external device connected to the electronic device via a public network among the one or more external devices. For example, the electronic device may determine, as the public device, the external device accessed via the public network. The public network described herein may refer to a network that is accessible by multiple users and may include, for example, a network established by a router. The electronic device may provide, in the expanded screen region 1720, information relating to an external device connected to the electronic device via a private network among the one or more external devices. The electronic device may determine, as the personal device, the external device accessed via the private network. The private network may refer to a network through which the electronic device and an external device are connected one-to-one and may include, for example, a Bluetooth network.

Figure 18:
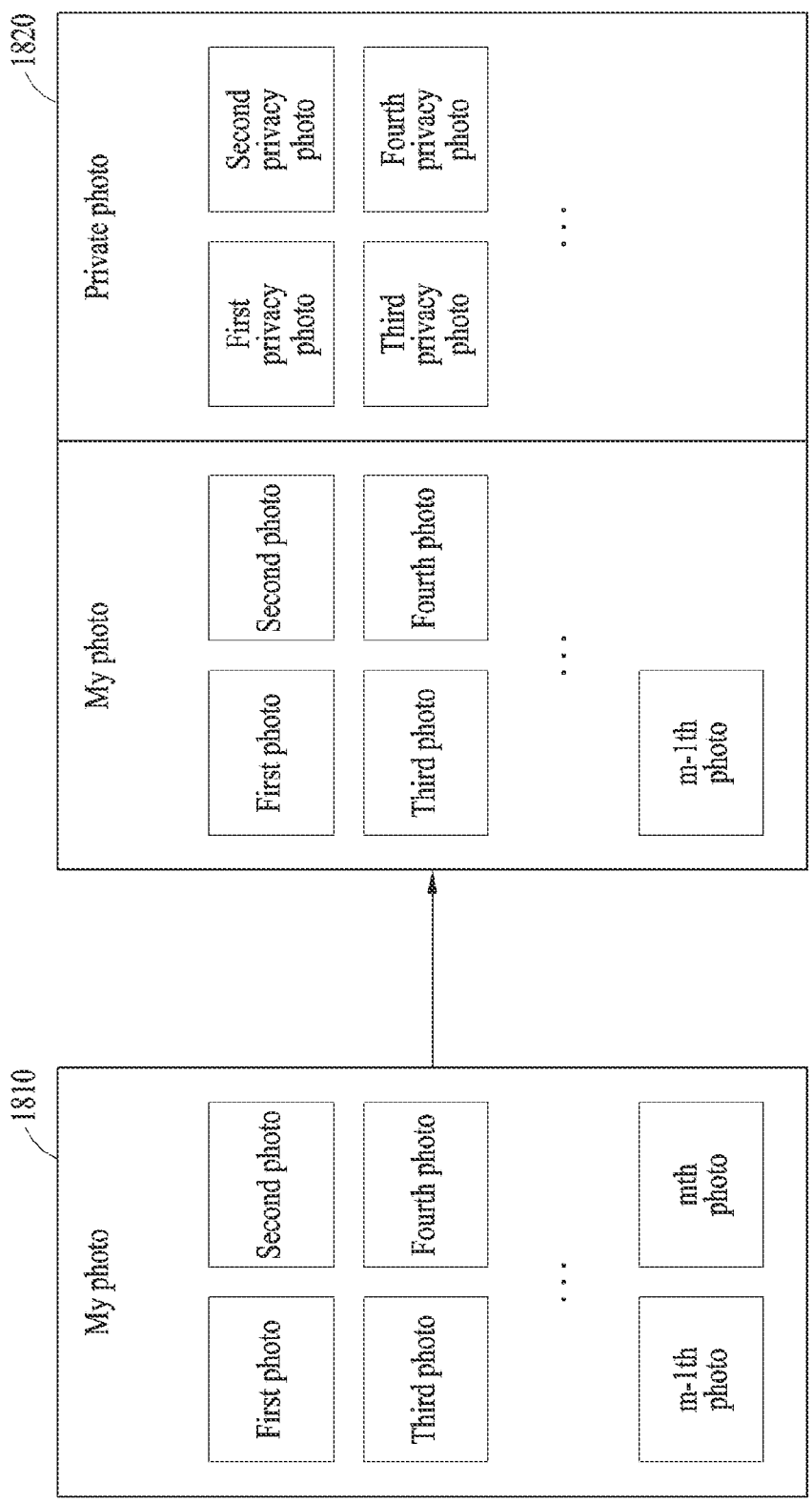
FIG. 18 is a diagram illustrating an example of providing a private content in response to screen expansion in an application according to various embodiments.

FIG. 18 is a diagram illustrating an example of providing a private content in response to screen expansion in an application according to various embodiments.

According to an example embodiment, a processor of an electronic device (e.g., the electronic device 101 of FIG. 1) may provide a default content in a default screen region 1810 during an execution of an application. When screen expansion is detected, the electronic device may provide a private content in an expanded screen region 1820.

For example, the application may be a photo application as illustrated in FIG. 18. In this example, the electronic device may provide a general photo content in the default screen region 1810. When a screen is expanded, the electronic device may provide a private photo content in the expanded screen region 1820 (e.g., an added region of the expanded screen region 1820). The private content may refer to a content of which a privacy level is set as a second privacy level and may include, for example, a content set by a user or a content generated by a personal activity and/or in a personal area.

For another example, the application may be a stock trading application. In this example, the electronic device may provide stock quote information in a default screen region. When a screen is expanded, the electronic device may additionally provide a screen displaying personal account information and bank balance of a user in an expanded screen region.

Figure 19:
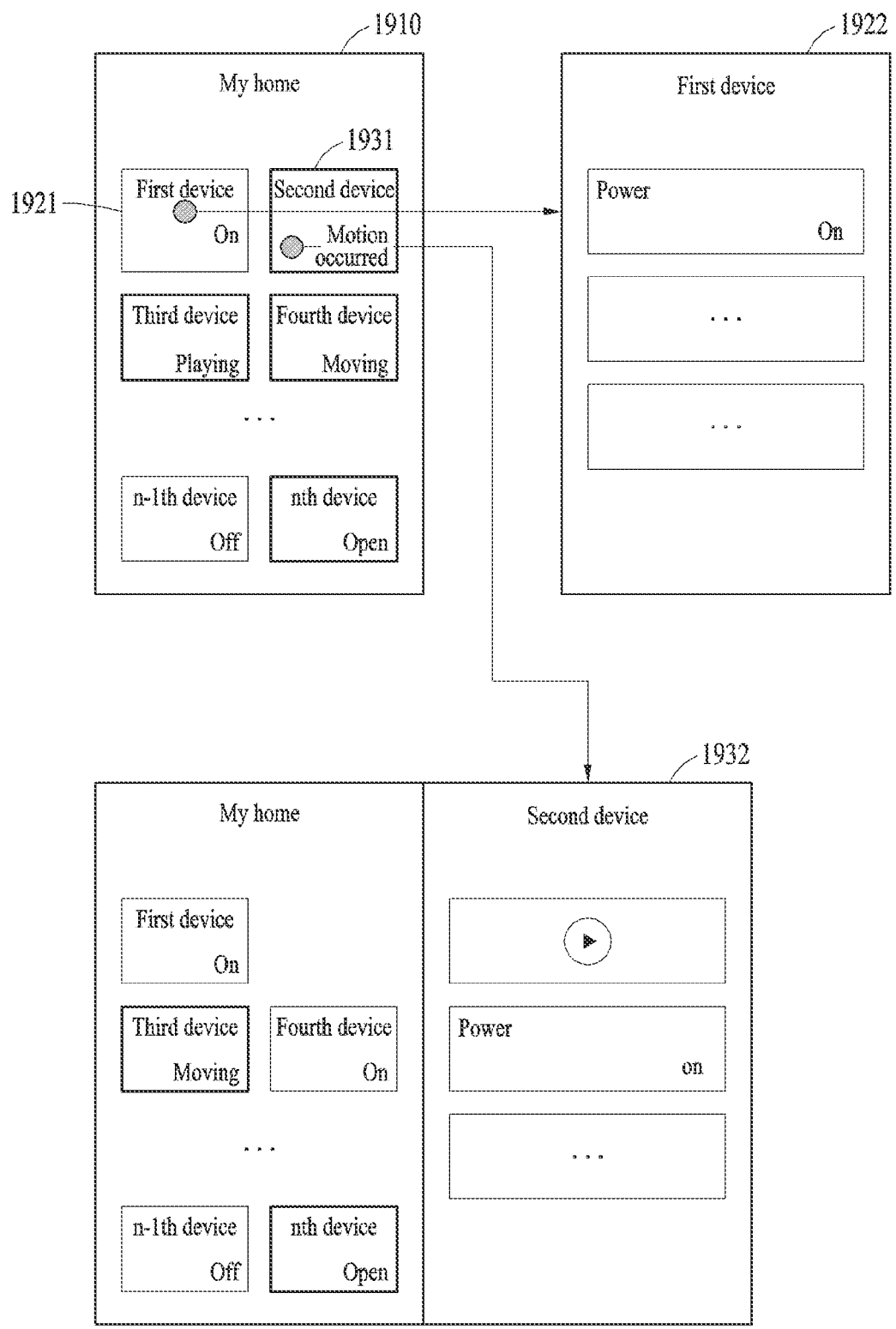
FIG. 19 is a diagram illustrating an example operation of providing information of an external device selected by a user from among external devices connected to an electronic device according to various embodiments.

FIG. 19 is a diagram illustrating an example operation of providing information of an external device selected by a user from among external devices connected to an electronic device according to various embodiments.

According to an example embodiment, a processor of an electronic device (e.g., the electronic device 101 of FIG. 1) may expand a screen of a display module when an occurrence of private information is detected from a target device after the target device is selected from among one or more external devices. For example, the electronic device may automatically expand the screen of the display module in response to an input of selecting the target device from which the private information occurs, without a physical screen expanding operation and/or another screen expanding operation.

For example, in response to the occurrence of the private information being detected from the selected target device, the processor of the electronic device may display the private information of the selected target device in an expanded screen region. In this example, when a private information-related event is detected from the selected target device, the processor of the electronic device may display the private information that is based on an event occurrent time in the expanded screen region. For example, when a second external device 1931 from which private information occurs is selected by an input from a user as illustrated in FIG. 19, the electronic device may provide private information 1932 of the selected second external device 1931 in the expanded screen region. The electronic device may also provide device information along with the private information 1932 of the second external device 1931.

In addition, when the occurrence of the private information is not detected from the selected target device, the processor of the electronic device may display device information of the selected target device in a default screen region 1910 while maintaining the size of the screen of the display module. For example, when a first external device 1921 from which private information does not occur is selected from among connected external devices by an input of a user as illustrated in FIG. 19, the electronic device may provide device information 1922 of the selected first external device 1921 in the default screen region 1910. For example, the electronic device may switch from a screen displaying a list of the connected external devices to a screen displaying the device information 1922 of the selected first external device 1921.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a display having an expandable screen;
a communication module comprising communication circuitry configured to establish communication with one or more external devices; and
at least one processor comprising processing circuitry and electrically connected to the display and the communication module,
a memory storing instructions that, when executed individually and/or collectively by the at least one processor, cause the electronic device to:
display, in a default screen region, a device information of the one or more external devices, through the display, wherein the device information is information about a state of the one or more external devices;
monitor an occurrence of private information from the one or more external devices, wherein the private information relates to at least one of a personal activity or a personal area;
receive, from a first external device in which first private information occurs among the one or more external devices, the first private information of the first external device;
in response to an occurrence of a private information-related event from a second external device among the one or more external devices, provide, in the default screen region, affordance feedback requesting a check for second private information of the second external device, wherein the private information-related event is based on at least one of or a combination of at least two of a personal activity, a personal area, or a preset time; and
based on screen expansion of the display being detected, display, in an expanded screen region of the electronic device, the first private information, through the display;
when the affordance feedback is applied to the second external device, provide the second private information based on an event occurrence time at which the private information-related event occurs; and
when the affordance feedback is not applied to the second external device, provide the second private information based on a time when screen expansion of the display is detected.

2. The electronic device of claim 1, wherein the instructions, when executed individually and/or collectively by the at least one processor, cause the electronic device to:
provide, as the affordance feedback, at least one of or a combination of at least two of a change of a graphic representation indicating the second external device in the default screen region, an additional graphic representation inducing a check of the second external device, tactile feedback, and a sound signal.

3. The electronic device of claim 1, wherein the memory stores at least one command which, when executed individually and/or collectively by the at least one processor, controls the electronic device to:
for a third external device from which a private information-related event does not occur until the screen expansion is detected, provide third private information based on a screen expansion detection time at which the screen expansion is detected.

4. The electronic device of claim 1, wherein the instructions, when executed individually and/or collectively by the at least one processor, cause the electronic device to:
based on the screen expansion of the electronic device being detected, perform authentication to verify a right of access to the first external device; and
based on the right of access to the first external device from which the first private information occurs being verified, provide the first private information in the expanded screen region.

5. The electronic device of claim 4, wherein the instructions, when executed individually and/or collectively by the at least one processor, cause the electronic device to:
based on the right of access to the first external device being allowed, provide the first private information of the first external device; and
based on the right of access to the first external device being not allowed, restrict provision of the first private information of the first external device.

6. The electronic device of claim 1, wherein the instructions, when executed individually and/or collectively by the at least one processor, cause the electronic device to:
based on the occurrence of the private information not being detected from all of the one or more external devices, arrange graphic representations corresponding to the one or more external devices based on the expanded screen region.

7. The electronic device of claim 1, wherein the instructions, when executed individually and/or collectively by the at least one processor, cause the electronic device to:
obtain, as the private information, at least one of or a combination of at least two of location information, image information, sound information, bioinformation, environment information, and safety information that occur in relation to at least one of a personal activity and a personal area of a user of the electronic device.

8. The electronic device of claim 1, wherein the instructions, when executed individually and/or collectively by the at least one processor, cause the electronic device to:
share, with another electronic device, an arrangement of the first private information output in the expanded screen region.

9. The electronic device of claim 1, wherein the instructions, when executed individually and/or collectively by the at least one processor, cause the electronic device to:
provide, in the default screen region, information relating to a public device among the one or more external devices; and
based on the screen expansion being detected, provide, in the expanded screen region, information relating to a personal device among the one or more external devices.

10. The electronic device of claim 1, wherein the instructions, when executed individually and/or collectively by the at least one processor, cause the electronic device to:
provide, in the default screen region, information relating to a device connected to the electronic device via a public network among the one or more external devices; and
based on the screen expansion being detected, provide, in the expanded screen region, information relating to a device connected to the electronic device via a private network among the one or more external devices.

11. The electronic device of claim 1, wherein the instructions, when executed individually and/or collectively by the at least one processor, cause the electronic device to:
provide a default content in the default screen region during an execution of an application; and
based on the screen expansion being detected, provide a private content in the expanded screen region.

12. The electronic device of claim 1, wherein the instructions, when executed individually and/or collectively by the at least one processor, cause the electronic device to:
based on a selection of a target device from among the one or more external devices being detected and an occurrence of target private information being detected from the selected target device, expand the expandable screen of the display.

13. The electronic device of claim 12, wherein the instructions, when executed individually and/or collectively by the at least one processor, cause the electronic device to:
based on the occurrence of the target private information being detected from the selected target device, display the target private information of the selected target device in the expanded screen region.

14. The electronic device of claim 12, wherein the instructions, when executed individually and/or collectively by the at least one processor, cause the electronic device to:
based on a private information-related event being detected from the selected target device, display the target private information in the expanded screen region based on an event occurrence time at which the private information-related event detected from the selected target device occurs.

15. The electronic device of claim 12, wherein the instructions, when executed individually and/or collectively by the at least one processor, cause the electronic device to:
based on the occurrence of the target private information not being detected from the selected target device, maintain a size of the expandable screen of the display and display device information of the selected target device in the default screen region of the display.

16. The electronic device of claim 1, wherein the instructions, when executed individually and/or collectively by the at least one processor, cause the electronic device to:
monitor whether the private information occurs by the one or more external devices based on at least one of or at least two of a specified time period, a screen expansion detection time at which the screen expansion is detected, and an event occurrence time at which a private information-related event occurs.

17. A method of providing private information performed by an electronic device, the method comprising:
displaying, in a default screen region, a device information of one or more external devices with which the electronic device establishes communication, through a display, wherein the device information is information about a state of the one or more external devices;
monitoring an occurrence of private information from the one or more external devices, wherein the private information from the one or more external devices relates to at least one of a personal activity or a personal area with which the electronic device establishes communication; and
receiving, from a first external device in which first private information occurs among the one or more external devices, the first private information of the first external device;
in response to an occurrence of a private information-related event from a second external device among the one or more external devices, providing, in the default screen region, affordance feedback requesting a check for second private information of the second external device, wherein the private information-related event is based on at least one of or a combination of at least two of a personal activity, a personal area, or a preset time;
based on screen expansion of the display having an expandable screen being detected, displaying the first private information, in an expanded screen region of the electronic device, through the display;
based on the affordance feedback being applied to the second external device, providing the second private information based on an event occurrence time at which the private information-related event occurs; and
based on the affordance feedback not being applied to the second external device, providing the second private information based on a time when screen expansion of the display is detected.

18. A non-transitory computer-readable storage medium storing instructions that, when executed by at least one processor, cause an electronic device to perform operations comprising:
   displaying, in a default screen region, a device information of one or more external devices with which the electronic device establishes communication, through a display, wherein the device information is information about a state of the one or more external devices;
   monitoring an occurrence of private information from the one or more external devices, wherein the private information relates to at least one of a personal activity or a personal area:
   receiving, from a first external device in which first private information occurs among the one or more external devices, the first private information of the first external device;
   in response to an occurrence of a private information-related event from a second external device among the one or more external devices, providing, in the default screen region, affordance feedback requesting a check for second private information of the second external device, wherein the private information-related event is based on at least one of or a combination of at least two of a personal activity, a personal area, or a preset time;
   based on screen expansion of the display having an expandable screen being detected, displaying the first private information, in an expanded screen region of the electronic device, through the display;
   when the affordance feedback is applied to the second external device, providing the second private information based on an event occurrence time at which the private information-related event occurs; and
   when the affordance feedback is not applied to the second external device, providing the second private information based on a time when screen expansion of the display is detected.

* * * * *